(12) United States Patent  
Tanabe et al.

(10) Patent No.: US 6,408,911 B1  
(45) Date of Patent: Jun. 25, 2002

(54) STUDLESS PNEUMATIC TIRE INCLUDING BLOCK-SHAPED ISLAND PORTIONS EACH HAVING SIPES

(75) Inventors: Chishiro Tanabe; Yuji Yamaguchi, both of Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 08/654,976

(22) Filed: May 28, 1996

(30) Foreign Application Priority Data

| Jun. 8, 1995 | (JP) | ............................................. 7-142204 |
| Jun. 8, 1995 | (JP) | ............................................. 7-142205 |
| Sep. 28, 1995 | (JP) | ............................................. 7-250998 |
| Nov. 15, 1995 | (JP) | ............................................. 7-297101 |

(51) Int. Cl.$^7$ .......................... B60C 11/11; B60C 11/12; B60C 107/00

(52) U.S. Cl. .............................. 152/209.5; 152/209.18; 152/902; 152/DIG. 3

(58) Field of Search ........................ 152/209 R, 209 D, 152/DIG. 3, 209.5, 209.18, 902

(56) References Cited

U.S. PATENT DOCUMENTS

| 2,587,297 | A | | 2/1952 | Duerksen | |
| D169,914 | S | * | 6/1953 | Roberts | .................. 152/DIG. 3 |
| 2,736,924 | A | | 3/1956 | Bean | |
| 3,012,599 | A | * | 12/1961 | Benson et al. | .......... 152/209 R |
| 3,115,919 | A | * | 12/1963 | Roberts | .................. 152/209 R |
| 3,999,907 | A | | 12/1976 | Pappas | |
| 5,176,765 | A | * | 1/1993 | Yamaguchi et al. | .... 152/209 R |

FOREIGN PATENT DOCUMENTS

| EP | 0 540 340 A2 | | 5/1993 | |
| EP | A-544638 | | 6/1993 | |
| EP | A-654366 | | 5/1995 | |
| JP | 62-241712 | * | 10/1987 | ............ 152/DIG. 3 |
| JP | 1-254406 | * | 10/1989 | ............ 152/209 R |
| JP | A-2-200503 | | 8/1990 | |
| JP | 2-310108 | * | 12/1990 | ............ 152/209 D |
| JP | 3-169723 | * | 7/1991 | ............ 152/209 R |
| JP | A-4-24105 | | 1/1992 | |
| JP | 04215507 | | 8/1992 | |
| JP | 5-169917 | * | 7/1993 | ............ 152/209 D |
| JP | 5-169923 | * | 7/1993 | ............ 152/209 R |
| JP | 05178028 | | 7/1993 | |
| JP | 06016016 | | 1/1994 | |
| JP | 07009816 | | 1/1995 | |
| JP | 07061209 | | 3/1995 | |

* cited by examiner

Primary Examiner—Steven D. Maki  
(74) Attorney, Agent, or Firm—Oliff & Berridge, PLC

(57) ABSTRACT

A studless pneumatic tire having excellent running performance of the tire on icy road surfaces. The tire has a plurality of block-shaped island portions formed on a cylindrical tread extending between a pair of sidewalls. The island portions have laterally extending sipes and are separated by a plurality of main grooves extending in the circumferential direction as well as by many lug grooves. Each island portion has a first sipe and a second sipe. The first sipe extends from a first lateral end facing a first main groove to traverse a first edge region of the island portion in a substantially axial direction and branches into a plurality of branch segments, thereby forming a fork-like shape, at a first interface between the first edge region and the central region of the island portion. Each branch segment traverses the central region of the island portion and reaches a point near a second interface between an opposite second edge region and the central region of the island portion. The second sipe extends from a second lateral end of the island portion facing a second main groove so as to traverse the second edge region and extends into the central region of the island portion in the axial direction. These first and second sipes divide the central region of the island portion into a larger number of island elements compared to the edge regions of the island portion.

5 Claims, 34 Drawing Sheets

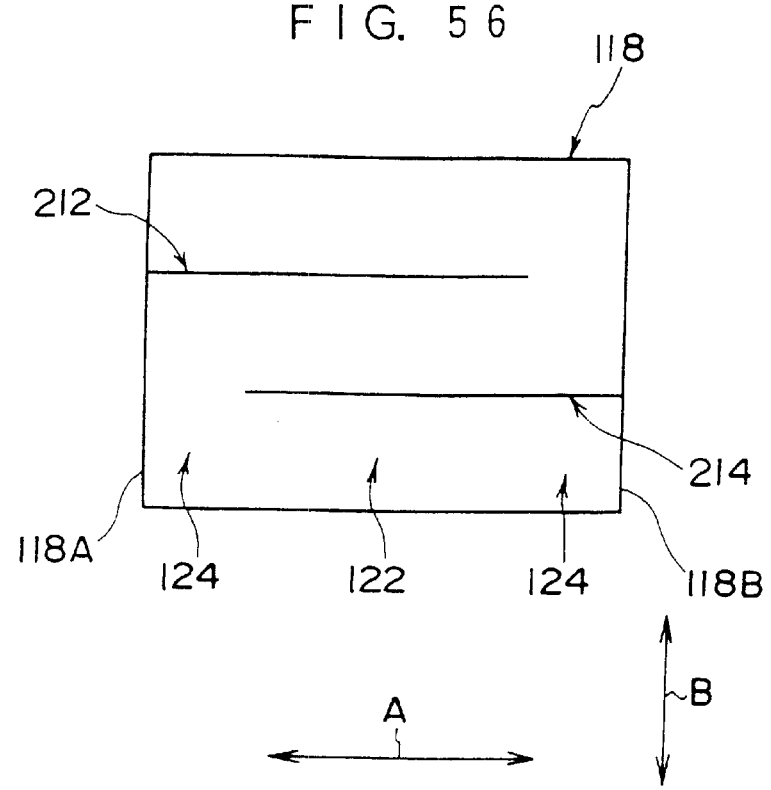
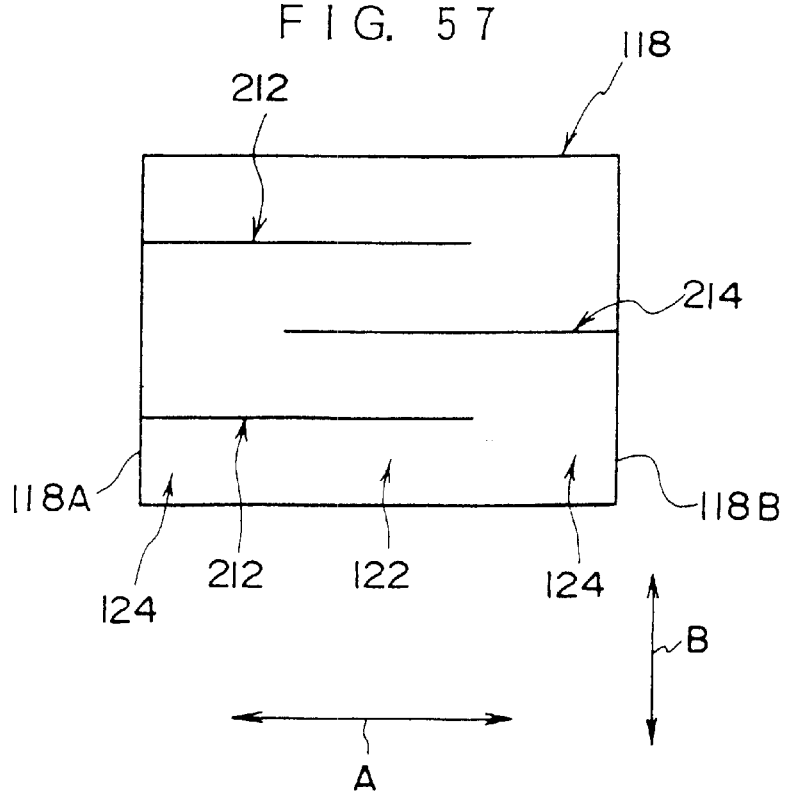

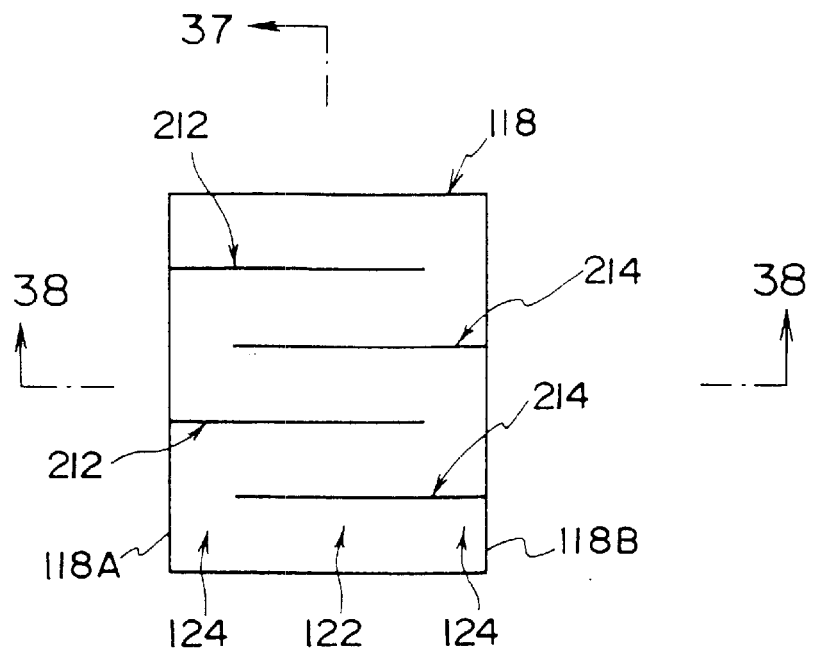
FIG. 58
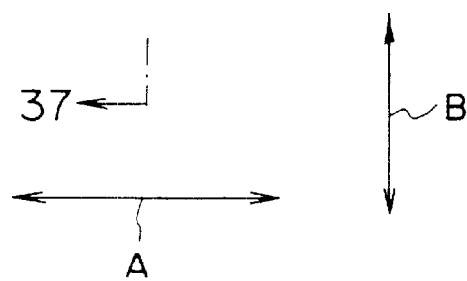
FIG. 59
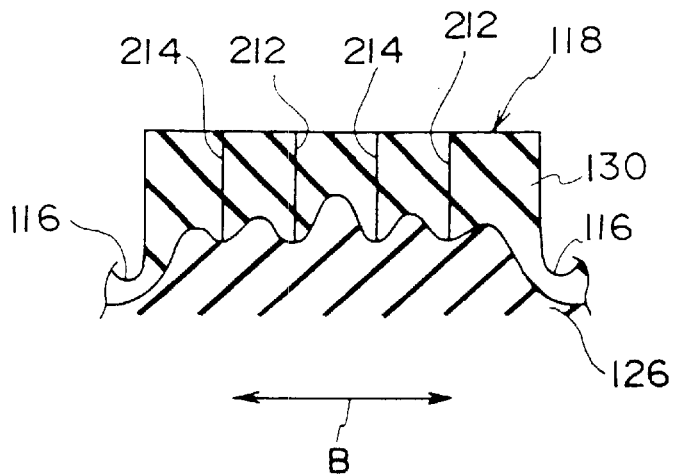

STUDLESS PNEUMATIC TIRE INCLUDING BLOCK-SHAPED ISLAND PORTIONS EACH HAVING SIPES

BACKGROUND OF THE INVENTION

1. Field of the Invention

The present invention relates to a studless pneumatic tire having excellent travel performance on roads covered partly or completely by ice and/or snow (hereinafter referred to as "icy roads"). The present invention also relates to a mold used for manufacturing through a vulcanizing molding process a pneumatic tire having a block pattern, and to a pneumatic tire manufactured using the mold.

2. Description of the Related Art

Since the use of spiked tires became prohibited, various improvements have been made on tire treads so as to obtain studless tires having improved performance.

The tread of a studless tire used for travel on icy roads has a plurality (3–5) of main grooves extending in the circumferential direction and a large number of lug grooves intersecting the main grooves, thereby forming block-shaped island portions between them. In order to improve the performance of the tire on icy surfaces, many sipes are provided in the island portions, thereby increasing the cumulative length of edges (hereinafter referred to as the "edge component") of the island portions.

However, when many lateral sipes traversing the island portions are provided so as to improve driving and braking performances of the tire on icy surfaces, the overall stiffness of the blocks decreases although the edge component of the island portions increases. This increases the possibility of chipping occurring in the blocks of heavy duty tires, such as tires for trucks and buses, which are used while subject to high internal pressure and a heavy load. In tires for passenger cars, island elements, which are portions of each block finely divided by sipes, tend to bend down while cornering, resulting in decreased driving stability due to a reduced effective ground contact area.

Therefore, it is necessary to maintain the stiffness of the island portions even when many sipes are formed. For example, a tire disclosed in Japanese Patent Application Laid-Open (JP-A) No. 2-200503 employs laterally extending sipes each having one end terminated within the island portion (i.e., only one end of each sipe is opened to a main groove) so as to maintain the stiffness of each island portion even when the density of sipes increases.

However, even when only one end of each sipe is opened to the main groove, the stiffness of each island portion decreases undesirably if many sipes are formed so as to obtain a desired edge effect.

The present inventors studied in detail the stiffness of island portions having sipes, and found that when the number of sipes is increased to obtain a desired edge effect, the stiffness at the lateral end regions of each island portion decreases more than expected as compared with the central region of the island portion, and that even when the sipes are formed such that each extends from one lateral edge of its corresponding island facing one main groove to a point near the other lateral edge thereof facing another main groove, the decrease of the stiffness cannot be completely prevented.

SUMMARY OF THE INVENTION

The present invention has been conceived in view of the above-described drawbacks, and an object of this invention is to provide a studless pneumatic tire which maintains the stiffness of island portions even when many sipes are formed, thereby providing improved driving stability and performance of the tire on icy roads while preventing island portions from being chipped.

According to a first aspect of the present invention, a studless pneumatic tire is provided which has a plurality of block-shaped island portions formed on a cylindrical tread extending between a pair of sidewalls. The island portions have laterally extending sipes and are separated by a plurality of main grooves extending in the circumferential direction as well as by many lug grooves. The sipes include first sipes and second sipes. Each first sipe extending from a first lateral end facing a first main groove traverses a first edge region of each island portion in a substantially axial direction and reaches a first interface between the first edge region and the central region of the island portion where the first sipe branches into a plurality of branch segments, thereby forming a fork-like shape. Each of these branch segments traverses the central region of the island portion and reaches a point near a second interface between a second edge region and the central region of the island portion. Each second sipe extending from a second lateral end of the island facing a second main groove traverses the second edge region and extends into the central region of the island portion in the axial direction. These first and second sipes divide the central region of the island portion into a larger number of island elements compared to the edge regions of the island portion.

In the studless pneumatic tire according to the first aspect of the present invention, the first sipe branches into a plurality of branch segments, thereby forming a fork-like shape, at the first interface between the first edge region and the central region of the island portion, and each branch segment traverses the central region and reaches a point near the second interface between the second edge region and the central region. The total projected length of the sipes in the circumferential direction increases in the central region because of the existence of the branch segments. This increases the edge component of each island portion. Further, each edge region of the island portion which is divided by the corresponding edge segment in the circumferential direction can effectively maintain the stiffness of the island portion.

In the first aspect of the present invention, when the tip of the second sipe extending from a lateral end opposite to the lateral end from which the first sipe extends is terminated at a position such that the tip of the second sipe does not intersect the first sipe, or when the second sipe has a fork-like shape similar to that of the first sipe and the tip of the second sipe is terminated at a position such that the tips of the branch segments of the second sipe do not intersect the first sipe, island elements divided by the sipes continue from a portion contacting one lug groove to a portion contacting the other lug groove in a staggered manner in the central region of the island portion. In contrast, each edge region of the island portion is divided by the edge segment of the fork-shaped sipe only, so that a decrease i n the stiffness of the island portion can be minimized.

According to a second aspect of the present invention, a studless pneumatic tire is provided which has a plurality of block-shaped island portions formed on a cylindrical tread ex tending between a pair of sidewalls. The island portions have laterally extending sipes and are separated by a plurality of main grooves extending in the circumferential direction as well as by many lug grooves. The sipes include first sipes and second sipes. Each first sipe has an extension segment and a return segment. The extension segment of the first sipe extends from a first lateral end of the island portion facing a first main groove so as to traverse a first edge region and a central region of the island portion in the axial direction. The return segment has a tip which is turned back at the interface between the central region and the second edge region or in the vicinity thereof and is terminated within the central region. Each second sipe also has an extension segment and a return segment, which are the same as those of the first sipe. By these first and second sipes, the central region of each island portion is circumferentially divided into a larger number of island elements compared to the edge regions thereof.

In the studless pneumatic tire according to the second aspect of the present invention, each block-shaped island portion in the tread has hook-shaped first and second sipes which extend in opposite directions from both lateral ends facing corresponding main grooves which extend in the circumferential direction. Therefore, the central region of the island portion is divided by both the extension segment and the return segment of each sipe. In contrast, each edge region of the island portion is divided by the extension segment of the first or second sipe only. Therefore, it is possible to form a large edge component within the central region of the island portion and to maintain a desired stiffness in each edge region of the island portion. As a result, desired driving and braking performance can be obtained, especially on icy surfaces, while preventing block chipping and decrease of driving stability, which have been considered to be problems which would occur if the desired driving and braking performance is obtained.

However, it was found in some cases that when many shapes are combined, the stiffness of each island portion does not become higher than in the case of using conventional sipes completely traversing each island portion even if the sipes having the above-described shapes are advantageous over the conventional sipes from the viewpoint of the stiffness.

The present inventors studied in detail and found that when many sipes having the above-described shapes are combined, the total projected length of portions of sipes within the central region of each island portion becomes longer than that within each edge region, so that the stiffness of the island portion within the central region thereof becomes lower than that within the edge regions. From the above, the present inventors considered that when the stiffness is increased in a region where the total projected length of the sipes is large, the overall stiffness of each island portion can be increased without decreasing the number and length of sipes.

Generally, the tread of a tire employs a two-layer structure consisting of a cap rubber layer and a base rubber layer so as to improve the heat generating performance of the tire. The present inventors found that when the above two-layer structure is modified such that in an area in which the total projected length of portions of the sipes within that area is larger than that in the remaining areas, the ratio of the volume of hard rubber to the volume of soft rubber is larger than that in the remaining areas, the stiffness of each island portion is prevented from decreasing, and that this structure makes it possible to obtain desired driving and braking performance, especially on icy surfaces, while preventing block chipping and decrease of driving stability.

In view of the forgoing, a third aspect of the present invention provides a studless pneumatic tire in which a plurality of block-shaped island portions each having sipes are provided on a cylindrical tread extending between a pair of annular sidewalls. The tread has at least two rubber layers having different hardnesses. In an area in which the total projected length of portions of the sipes within that area is larger than those in the remaining areas, the ratio of the volume of hard rubber relative to the volume of soft rubber is larger than those in the remaining areas.

Examples of the shape of each sipe include a straight shape, a wavy shape, a zigzag shape, a hook-like shape, and a fork-like shape. These shapes may be used singly or in combination.

Next, the operation of the studless pneumatic tire according to the third aspect of the present invention will be described.

In the tire according to the third aspect of the present invention, in an area in which the total projected length of portions of the sipes within that area is larger than those in the remaining areas, the ratio of the volume of hard rubber relative to the volume of soft rubber is larger than those in the remaining areas. Since a decrease in the stiffness of the island portion caused by the formation of sipes can be prevented by the existence of the hard rubber, the stiffness of the block-shaped island portion can be guaranteed.

When a soft rubber layer is disposed on the surface of the tread and a hard rubber layer is disposed radially inward of the soft rubber layer, the soft rubber layer located at the surface is well fitted to the slightly uneven surface of an icy road, resulting in increased gripping performance. Accordingly, increased traction force and braking force can be obtained.

Since the hard rubber increases the stiffness of each block-shaped island portion, bending of the island portion is suppressed, thereby guaranteeing desired driving stability. Also, the island portion is prevented from chipping.

Accordingly, it is possible to provide desired driving and braking performance, especially on icy surfaces, while solving the problems of decreased driving stability and block chipping.

According to a fourth aspect of the present invention, the studless pneumatic tire of the third aspect has a plurality of block-shaped island portions each of which has first and second sipes. The first sipe extends from a first lateral end of the island portion so as to pass through a first edge region adjacent to the first lateral end in the substantially axial direction of the tire and branches into a plurality of branch segments at a first interface between the first edge region and the central region. Each branch segment passes through the central region to a point in the vicinity of a second interface between the central region and a second edge region. The second sipe extends from a second lateral end in a substantially axial direction so as to pass through the second edge region adjacent to the second lateral end, thereby entering the central region.

The operation of the tire according to the fourth aspect of the present invention will be described.

In the studless pneumatic tire according to the fourth aspect, there are provided first and second sipes which extend from both lateral ends of each island portion in opposite directions. Therefore, the central region of each island portion is circumferentially divided into many island elements by a plurality of branch segments and the second sipe. In contrast, in each edge region, the island portion is divided into only two by the first or second sipe. Accordingly, a large edge component can be obtained in the central region of the island portion and a desired stiffness is maintained in the edge regions.

According to a fifth aspect of the present invention, the studless pneumatic tire of the third aspect has the following structure. Hook-shaped first and second sipes are provided. Each first sipe has an extension segment and a return segment. The extension segment of the first sipe extends from a first lateral end and traverses a first edge region and a central region in a substantially axial direction. One end of the return segment of the first sipe is turned back at the interface between the central region and a second edge region or in the vicinity thereof, and the other end of the return segment is terminated within the central region. Each second sipe also has an extension segment and a return segment. The extension segment of the second sipe extends from a second lateral end of the island portion traverses the second edge region and the central region of the island portion in a substantially axial direction. One end of the return segment is turned back at the interface between the central region and the first edge region or in the vicinity thereof, and the other end of the return segment is terminated within the central region.

The operation of the studless pneumatic tire according to the fifth aspect of the present invention will be described.

In the studless pneumatic tire according to the fifth aspect, there are provided first and second hook-shaped sipes which extend from both lateral ends of each island portion in opposite directions. Therefore, the central region of each island portion is circumferentially divided into many island elements by the extension segments and the return segments. In contrast, in each edge region, the island portion is divided only by the first or second sipe. Accordingly, a large edge component can be obtained in the central region of the island portion and a desired stiffness is maintained in the lateral edge regions.

As described above, in order to increase the edge component in a studless tire, thereby improving performance on icy surfaces (hereinafter referred to as "on-ice performance"), it is effective to constitute the tread portion of the tire by block-shaped island portions divided by a plurality of main grooves extending in the circumferential direction and many lug grooves extending in a direction intersecting the main grooves, and to provide many lateral sipes in each block-shaped island portion.

Lateral sipes are generally classified into two types, i.e., both-end open type sipes (open sipes) which completely traverse island portions, and one-end open type sipes whose first ends open to a main groove and whose second ends terminate within the island portion. The former sipes have an advantage that they can increase the edge component more than the latter sipes. However, the former sipes have a disadvantage that the wear resistance against partial wear and driving stability on dry road surfaces (hereinafter referred to as "dry driving stability") provided by the former sipes are lower than in the case of using the latter sipes because of the decreased stiffness of each island portion. On the contrary, the latter sipes have a disadvantage that the edge component provided by the latter sipes is smaller than in the case of using the former sipes. However, the latter sipes have an advantage that the wear resistance against partial wear and dry driving stability provided by the latter sipes are higher than in the case of using the latter sipes, because the stiffness of each island portion decreases due to formation of the sipes. Although the both-end open type sipes and the one-end open type sipes both have disadvantages, these disadvantages are insubstantial.

Regardless of the type of lateral sipes, blades for forming sipes must be disposed within each depression for forming a block-shaped island portion, which is provided in a mold for vulcanizing molding, when tires having such lateral sipes are manufactured. Since the sipe-forming blades are very thin plates, the stiffness thereof is usually insufficient. Therefore, there is a possibility that the blades bend during the process of vulcanizing molding.

This problem depends on the kind of tires to be manufactured. In tires for heavy loads such as tires for trucks and buses, the depth of each sipe is large, and the hardness of the tread rubber is high. Thus, a large force acts on the tread during the process of vulcanizing molding, thereby causing bending of blades.

The above-described problem also depends on the type of sipes. When one-end open type sipes are formed, only two sides among the four sides of each blade are fixed to a depression (i.e., when one-end open type sipes are formed, only one of the longitudinal ends of each blade is fixed), the supporting stiffness of each blade decreases, resulting in bending of blades.

Also, there is a need to maintain the on-ice performance of a pneumatic tire having such lateral sipes by improving the water draining performance of the tire.

Therefore, another object of the present invention is to provide a mold for vulcanizing molding which can prevent bending of blades during the process of vulcanizing molding.

Still another object of the present invention is to provide a tire which is manufactured using the mold as set forth above and which has an excellent on-ice performance.

To accomplish these objects, according to a sixth aspect of the present invention, there is provided a mold for vulcanizing molding which is used for manufacturing a pneumatic tire by vulcanizing molding. The tire has a block pattern having a plurality of block-shaped island portions, which are divided by main grooves extending in the circumferential direction of the tire and lug grooves extending in the widthwise direction of the tire. The mold has blades for forming lateral sipes, which are formed in each block-shaped island portion and extend in the widthwise direction of the tire. Each blade has at least one bent portion, and has a flask-shaped cross section at a portion corresponding to the bottom of a corresponding sipe.

According to the seventh aspect of the present invention, the portion of the blade having a flask-shaped cross section and corresponding to the bottom of a corresponding sipe is divided at the bent portion of the blade.

According to the eighth aspect of the present invention, there is provided a pneumatic tire manufactured by using the mold for vulcanizing molding according to the sixth or seventh embodiment.

According to the ninth aspect of the present invention, the pneumatic tire according to the eighth aspect has one-end open type sipes, the first ends of which are opened to a lateral end of an island portion and the second ends of which are substantially terminated within the island portion.

According to the tenth aspect of the present invention, the inner end of each lateral sipe has a flask-shaped cross section.

According to the sixth aspect of the present invention, each blade for forming a lateral sipe has at least one bent portion. Therefore, the stiffness of each blade is higher than a blade for forming a straight sipe. Accordingly, the blades do not bend during the process of vulcanizing molding.

Further, since the portion of each blade corresponding to the bottom of a lateral sipe has a flask-shaped cross section, the bottom of a lateral sipe formed by the blade also has a flask-shaped cross section, so that the on-ice performance of the tire can be maintained at a satisfactory level. In detail, when the lateral sipe has at least one bent portion so as to form a sipe having a bent shape, water draining performance decreases due to contact of the edge portions of the lateral sipe. Therefore, on icy road surfaces, there is a possibility that the frictional coefficient p of the tire decreases with a consequent decrease in the on-ice performance. In the present embodiment, a portion of each blade corresponding to the bottom of a corresponding lateral sipe is formed to have a flask-shaped cross section, thereby making the cross section of the bottom of the correspond lateral sipe in a flask-like shape, the performance of draining water from the bottom of the sipe can be improved. Thus, the frictional coefficient μon icy road surfaces can be increased to maintain excellent on-ice performance.

The pneumatic tire according to the eighth aspect of the present invention manufactured by using the mold for vulcanizing molding according to the sixth or seventh aspect of the present invention can prevent bending of blades during the process of vulcanizing molding and can maintain the on-ice performance at a desired level.

Since the bottom portion of each lateral sipe has a flask-shaped cross section, stress acting on the bottom portion can be dispersed. Therefore, it is possible to prevent generation of cracks in the bottom portion of each sipe.

Further, according to the seventh aspect of the present invention depending on the sixth aspect of the present invention, the portion of each blade having a flask-shaped cross section and corresponding to the bottom of a sipe is divided at the bent portion or portions of the blade. This facilitates the manufacture of blades compared to the case where the portion having a flask-shaped cross section is not divided.

According to the ninth aspect of the present invention depending on the eighth aspect of the present invention, each lateral sipe of a pneumatic tire is of one-end open type in which one end of each sipe opens to one end of an island portion, and the other end thereof terminates within the island portion. Therefore, the stiffness of the island portion can be increased more than in the case where the lateral sipe is of a both-end open type, i.e., an open sipe. This enhances both wear resistance against partial wear and dry driving stability.

According to the tenth aspect of the present invention depending on the ninth aspect of the present invention, since not only the bottom of each blade but also one end of the blade corresponding to the inner end of a corresponding sipe has a flask-shaped cross section, generation of cracks at the other end of the lateral sipe is prevented. Therefore, generation of cracks can be prevented more effectively through the synergy between the effect of preventing cracks at the inner end of the sipe and the effect of preventing generation of cracks at the bottom portion of the sipe. Since the inner end of the hook-shaped sipe has a flask-shaped cross section, the water draining performance of the sipe at the inner end thereof can be improved.

The above and other objects, features, and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein:

FIG. 56 is a plan view of a block-shaped island portion of a seventh comparative tire;

FIG. 57 is a plan view of a block-shaped island portion of an eighth comparative tire;

FIG. 58 is a plan view of a block-shaped island portion of an eleventh comparative tire;

FIG. 59 is a cross-sectional view of the block-shaped island portion shown in FIG. 58 taken along line 37—37 in FIG. 58;

FIGS. 69A and 69B relate to a fortieth embodiment of the present invention in which hook-shaped sipes are formed in each block-shaped island portion, wherein FIG. 69A is a perspective view of a blade, and FIG. 69B is a plan view of the block-shaped island;

FIGS. 70A and 70B relate to a forty-first embodiment of the present invention in which hook-shaped sipes are formed in each block-shaped island portion, wherein FIG. 70A is a perspective view of a blade, and FIG. 70B is a plan view of the block-shaped island;

FIGS. 71A and 71B relate to a forty-second embodiment of the present invention in which tuning fork-shaped sipes are formed in each block-shaped island portion, wherein FIG. 71A is a perspective view of a blade, and FIG. 71B is a plan view of the block-shaped island.

DESCRIPTION OF THE PREFERRED EMBODIMENTS

Preferred embodiments of the present invention will be described hereinbelow.

Figure 1:
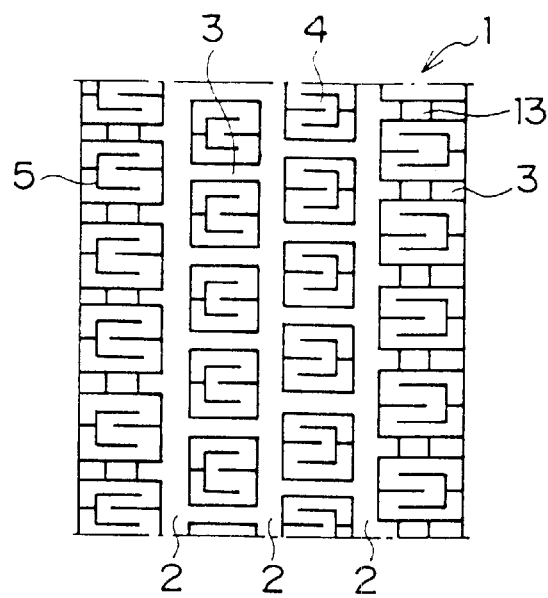
FIG. 1 is a plan view of the tread of a studless pneumatic tire according to a first embodiment of the present invention.
Figure 2:
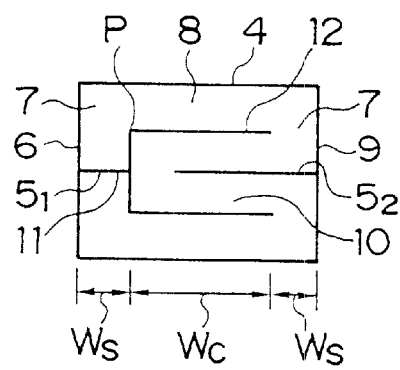
FIG. 2 is an enlarged plan view of an island portion of the tread according to the first embodiment.

FIG. 1 shows a plan view of the tread of a studless pneumatic tire according to a first embodiment of the present invention, and FIG. 2 shows an enlarged plan view of an island portion shown in FIG. 1.

The studless tire according to the first embodiment has a plurality of block-shaped island portions 4 formed on a cylindrical tread 1 extending between a pair of sidewalls (not shown). The island portions 4 are separated by a plurality of main grooves 2 extending in the circumferential direction as well as by many lug grooves 3. Each island portion 4 has sipes 5 extending parallel to the center axis of the tire. The sipes 5 include first sipes $5_1$ and second sipes $5_2$. Each first sipe $5_1$ extending from a first lateral end 6 of an island portion 4 facing a main groove 2 traverses a first edge region 7 of the island portion 4 in a direction substantially parallel to the center axis of the tire (hereinafter simply referred to as "the axial direction") and reaches a first interface between the first edge region 7 and the central region 8 of the island portion 4 where the first sipe $5_1$ branches into two branch segments 12, thereby forming a fork-like shape. Each of these branch segments 12 traverses the central region 8 of the island 4 and reaches a point near a second interface between an opposite second edge region 7 and the central region 8 of the island portion 4. Each second sipe $5_2$ extending from a second lateral end 9 of the island portion 4 facing another main groove 2 traverses the second edge region 7 and extends into the central region 8 of the island portion 4 in the axial direction. These first and second sipes $5_1$ and $5_2$ divide the central region 8 of each island portion 4 in a larger number of island elements compared to the edge regions 7 thereof.

The tire according to the present embodiment may have a reinforced structure. In detail, a radial carcass of a single or a few plies is disposed between a pair of sidewalls. In each ply, textile cords such as polyester cords or rayon cords are disposed such that they intersect the equatorial plane of the tire at substantially right angles. Also, a belt structure is disposed radially outward of the radial carcass at the crown portion thereof. The belt structure comprises a plurality (usually two) of plies each of which comprises non-extensible cords such as steel cords oriented obliquely at a small angle with respect to the equatorial plane and which are superposed such that their cords intersect one another. Moreover, an auxiliary ply is formed around them by circumferentially and spirally winding a strip around them. The strip comprises a plurality of heat-shrinkage textile cords such as nylon cords disposed therein and rubberized.

In the embodiment shown in FIGS. 1 and 2, an edge segment 11 of the fork-shaped first sipe $5_1$, which axially extents within the first edge region 7, branches into two branch segments 12 extending in two opposite circumferential directions at the interface between the first edge region 7 and the central region 8. Each of the branch segments 12 bends at a point P so as to run in the axial direction and then passes through the central region 8, thereby reaching the interface between the central region 8 and the second edge region 7. The second sipe $5_2$ extending from the opposite lateral end 9 of the island portion 4 facing another main groove 2 passes through the second edge region 7 and enters the central region 8, in which it runs between the branch segments 12 of the first sipe $5_1$ and terminates in the vicinity of the interface between the central region 8 and the first edge region 7. As a result, each of the edge regions 7 of the island portion 4 is divided into two island elements 10 each having a substantially equal circumferential length, while the central region 8 of the island portion 7 is divided into four island elements 10 each having a substantially equal circumferential length.

The number of branches from the edge segment 11 of the fork-shaped first sipe $5_1$ may be increased to three or more, insofar as the purpose thereof is achieved. Therefore, equally spaced parallel branch segments can be formed in the central region 8 so as to divide the island portion 4 into a larger number of island elements.

Reference numeral 13 in FIG. 1 denotes a platform formed by raising a portion of the bottom of each lug groove 3 such that the platform corresponds to the central region 8 of the island portion 4. When this platform 13 is provided, the circumferential stiffness of the island portion 4 within the central region 8 can be increased around the position corresponding to the platform 13.

In the present invention, it is preferred that the width $W_S$ of each edge region 7 of each island portion 4 be ⅑–⅓ of the entire width of the island portion 4, and that the width $W_C$ of the central region 8 therefore be ⅓–⅞ of the entire width of the island portion 4.

Each branch segment 12 of the fork-shaped first sipe $5_1$ may be curved at point P, without being bent at right angles, so as to change its extending direction in the axial direction and enter the central region 8.

Figure 3:
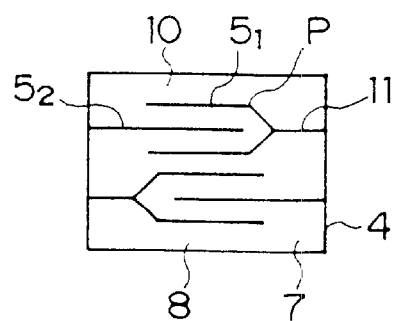
FIG. 3 is a plan view of an island portion according to a second embodiment of the present invention.

The shapes of the sipes 5 are not limited to the straight shapes shown in FIGS. 1–3, and they may have zigzag shapes or wavy shapes.

Insofar as the purpose of the branch segments 12 can be achieved, each of them may be extended to the second lateral end 9 while traversing the second edge region 7 without stopping its extension at the interface between the central region 8 and the second edge region 7. In this case, the depth of each sipe is reduced.

FIG. 3 shows a plan view of an island portion according to a second embodiment of the present invention.

In the present embodiment, two pairs of modified first sipes 51 and straight second sipes 52 are combined together such that they are oriented in opposite directions. Each first sipe $5_1$ has a slant portion between the edge segment 11 and the bend point P of each branch segment 12. By the sipes having the above-described configuration, the island portion 4 is divided into three island elements 10 in the edge regions 7 and seven island elements 10 in the central region 8.

Figure 4:
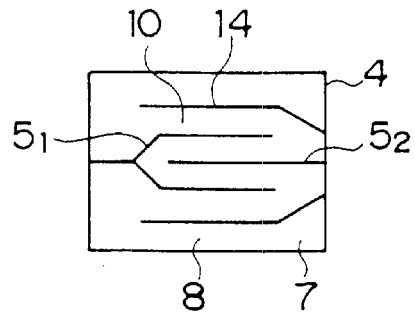
FIG. 4 is a plan view of an island portion according to a third embodiment of the present invention.

FIG. 4 shows a plan view of an island portion according to a third embodiment of the present invention.

In the present embodiment, a single pair of a modified first sipe $5_1$ and a straight second sipe $5_2$ used in the previous embodiment is provided, and an additional sipe 14 is provided on each of the front and rear sides of the paired sipes $5_1$ and $5_2$ in the rotational direction of the tire. Each additional sipe 14 bends in the vicinity of the interface between the edge region 7 and the central region 8 and extends in the axial direction. Thus, the island portion 4 is divided into six island elements 10 in the central region 8, two island elements 10 in the first edge region 7, and four island elements 10 in the second edge region 7.

Figure 5:
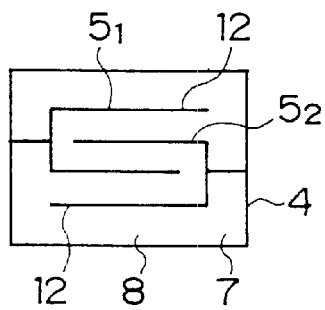
FIG. 5 is a plan view of an island portion according to a fourth embodiment of the present invention.

FIG. 5 shows a plan view of an island portion according to a fourth embodiment of the present invention.

In the present embodiment, unlike the second sipe $5_2$ used in the first embodiment, the second sipe $5_2$ has a fork-like shape similar to that of the first sipe $5_1$. The first and second sipes $5_1$ and $5_2$ are oriented in opposite directions such that the tips of the branch segments 12 of each sipe are located in the vicinity of the corresponding interface between the central region 8 and the corresponding edge region 7, thereby preventing the tips of the branch segments 12 from intersecting the other sipe. Thus, the island portion 4 is divided into two island elements in the edge regions 7 and five island elements in the central region 8.

The fork-shaped second sipe may have three or more branch segments as in the case of the above-described first sipe.

Figure 6:
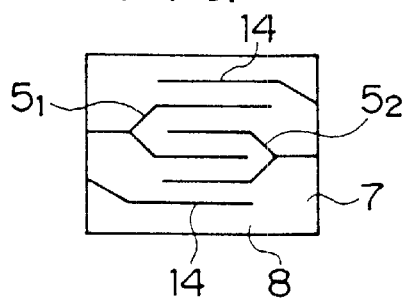
FIG. 6 is a plan view of an island portion according to a fifth embodiment of the present invention.

FIG. 6 shows a plan view of an island portion according to a fifth embodiment of the present invention.

In the present embodiment, fork-shaped modified sipes used in the second embodiment (FIG. 3) are used as the first and second sipes $5_1$ and $5_2$ and are combined in a manner similar to that in the fourth embodiment (FIG. 5). In addition, a bent additional sipe 14 is provided on the front and rear sides of the paired sipes $5_1$ and $5_2$ in the rotational direction of the tire. Thus, the island portion 4 is divided into three island elements in the edge regions 7 and seven island elements in the central region 8.

Figure 7:
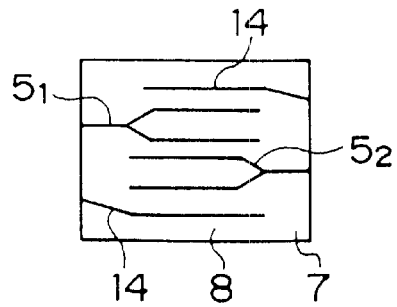
FIG. 7 is a plan view of an island portion according to a sixth embodiment of the present invention.

FIG. 7 shows a plan view of an island portion according to a sixth embodiment of the present invention.

In the present embodiment, fork-shaped modified sipes are used as the first and second sipes $5_1$ and $5_2$ and are disposed side by side such that they are oriented in opposite directions. In addition, a bent additional sipe 14 is provided on the front and rear sides of the paired sipes $5_1$ and $5_2$ in the rotational direction of the tire. Thus, the island portion 4 is divided into three island elements in the edge regions 7 and seven island elements in the central region 8.

Figure 8:
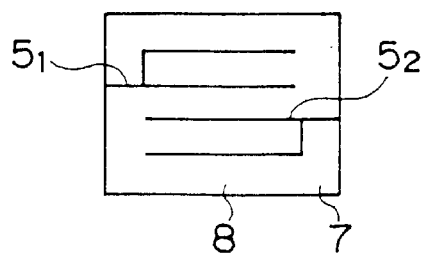
FIG. 8 is a plan view of an island portion according to a seventh embodiment of the present invention.

FIG. 8 shows a plan view of an island portion according to a seventh embodiment of the present invention.

In the present embodiment, h-shaped sipes are used as the first and second sipes $5_1$ and $5_2$ and are disposed side by side such that they are oriented in opposite directions. Thus, the island portion 4 is divided into two island elements in the edge regions 7 and five island elements in the central region 8.

Figure 9:
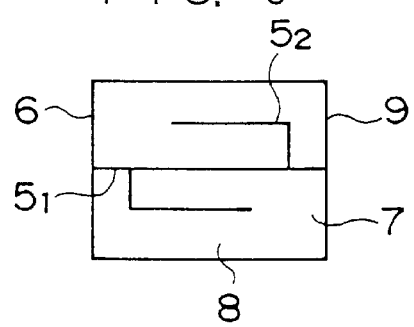
FIG. 9 is a plan view of an island portion according to an eighth embodiment of the present invention.

FIG. 9 shows a plan view of an island portion according to an eighth embodiment of the present invention.

In the present embodiment, h-shaped modified sipes are used as the first and second sipes $5_1$ and $5_2$ They are formed from the right and left lateral ends 6 and 9 such that they are partly joined or integrated. Thus, the island portion 4 is divided into two island elements in the edge regions 7 and four island elements in the central region 8.

Figure 10:
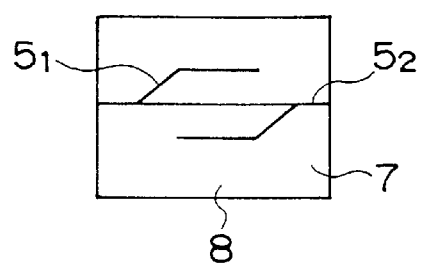
FIG. 10 is a plan view of an island portion according to a ninth embodiment of the present invention.

FIG. 10 shows a plan view of an island portion according to a ninth embodiment of the present invention.

In the present embodiment, h-shaped modified sipes are used as the first and second sipes $5_1$ and $5_2$ They are formed from the right and left lateral ends 6 and 9 such that they are partly joined or integrated. Thus, the island portion 4 is divided into two island elements in the edge regions 7 and four island elements in the central region 8.

In order to evaluate the performance of the tires according to the above-described embodiments, the following two tests were carried out.

Test 1: Radial tires having a size of 11R22.5 for trucks and buses were tested to evaluate braking performance on icy surfaces and block chipping.

Test 2: Radial tires having a size of 185/70R13 for passenger cars were tested to evaluate braking performance on icy surfaces and driving stability.

Figure 11:
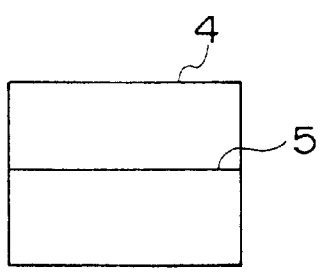
FIG. 11 is a plan view of an island portion of a first comparative tire.
Figure 12:
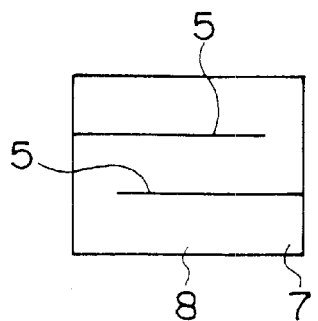
FIG. 12 is a plan view of an island portion of a second comparative tire.
Figure 13:
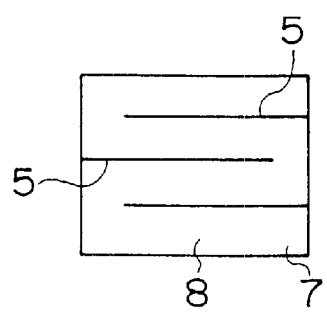
FIG. 13 is a plan view of an island portion of a third comparative tire.

In tires for trucks and buses used in Test 1, island portions were spread on the tread as shown in FIG. 1 (however, each tire had five main grooves). Tires according to the above-described embodiments employed the sipe layout according to the first embodiment shown in FIGS. 1 and 2. Three kinds of tires of comparative examples (hereinafter referred to as "comparative tires") used in Test 1 had sipe layouts shown in FIGS. 11–13, respectively. In each island portion of the first comparative tire, a single straight sipe 5 completely traversing the island portion was provided so as to bisect the island portion, as shown in FIG. 11. In each island portion of the second comparative tire, two straight sipes 5 were formed in a staggered manner such that their tips were terminated at the respective interfaces between the central region 8 and the edge regions 7, as shown in FIG. 12. Thus, each edge region 7 of the island portion was divided into two island elements, and the central region 8 thereof was divided into three island elements each having an identical length. In each island portion of the third comparative tire, three straight sipes 5 were formed in a staggered manner such that their tips were terminated at the respective interfaces between the central region 8 and the edge regions 7, as shown in FIG. 13. Thus, the island portion was divided into two island elements in one edge region 7, into three island elements in the other edge region 7, and into four island elements in the central region 8.

The tires of the embodiments and the comparative tires used for Test 1 had identical dimensions. That is, each main groove had a depth of 20 mm, each lug groove had a depth of 15 mm, each island portion had a length of 23 mm and a width of 30 mm, and each sipe had a width of 0.5 mm and a depth of 10 mm. The width $W_C$ of the center region of each island portion was 18 mm, while the width $W_S$ of each edge region of each island portion was 6 mm.

Figure 14:
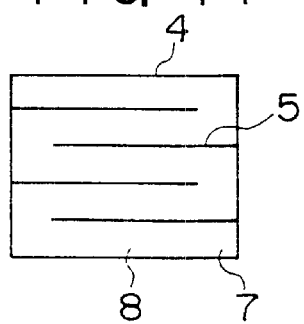
FIG. 14 is a plan view of an island portion of a fourth comparative tire.
Figure 15:
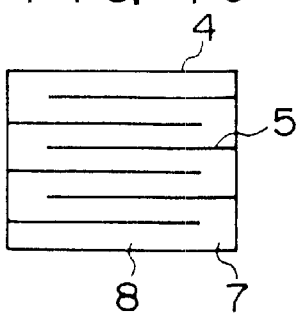
FIG. 15 is a plan view of an island portion of a fifth comparative tire.

In tires for passenger cars used in Test 2, island portions were spread on the tread as shown in FIG. 1 (however, each tire had five main grooves). Tires according to the above-described embodiments employed the sipe layout according to the fifth embodiment shown in FIG. 6. Fourth and fifth comparative tires used in Test 2 had sipe layouts shown in FIGS. 14 and 15, which are similar to the sipe layouts which have been described with reference to FIGS. 12 and 13. In each island portion of the fourth comparative tire, four straight sipes 5 were formed in a staggered manner such that their tips were terminated at the respective interfaces between the central region 8 and the edge regions 7, as shown in FIG. 14. Thus, each edge region 7 of the island portion was divided into three island elements, and the central region 8 thereof was divided into five island elements each having an identical length. In each island portion of the fifth comparative tire, six straight sipes 5 were formed in a staggered manner such that their tips were terminated at the respective interfaces between the central region 8 and the edge regions 7, as shown in FIG. 15. Thus, the island portion was divided into four island elements in each edge region 7, and was equally divided into seven island elements in the central region 8.

The tires of the embodiments and the comparative tires used for Test 2 had identical dimensions. That is, each main groove and each lug groove both had a depth of 10 mm, each island portion had a length of 25 mm and a width of 20 mm, and each sipe had a width of 0.3 mm and a depth of 7 mm. The width $W_C$ of the center region of each island portion was 12 mm, while the width $W_S$ of each edge region of each island portion was 4 mm.

Each of the tires for trucks and buses was attached to a rim of 22.5×7.50, and air was charged to obtain an internal pressure of 7.0 Kgf/Cm². Braking operation was performed (to a locked state) while a vehicle was traveling on a test course of an icy surface at a speed of 20 Km/H in a loaded state. The distance from a point where braking was started to a point where the vehicle completely stopped was measured. The test for block chipping was performed by driving the vehicle on an asphalt-paved road at an average speed of 60 Km/H over a distance of 20,000 Km and checking the degree of block chipping after the travel.

The results of the test are shown in Table 1.

TABLE 1

|  | Embodiment 1 | Comparative tire 1 | Comparative tire 2 | Comparative tire 3 |
| --- | --- | --- | --- | --- |
| On ice braking performance | 120 | 100 | 105 | 95 |
| Block chipping | none | none | occurred to a slight degree | occurred to a considerable degree |

Note:
Values representing braking performance are indexes which were obtained from the inverses of the measured distances using the value of Comparative tire 1 as a reference.

Each of the tires for passenger cars was attached to a 13×5½J rim, and air was charged so as to obtain an internal pressure of 1.9 Kgf/Cm². A braking test on an icy surface was performed in the same manner as for the tires for trucks and buses (initial speed: 20 Km/H). The test for driving stability was performed by traveling a vehicle on an asphalt-paved road at speeds of 50–120 km/H so as to simulate travel on ordinary roads and on highways, and the driving stability was evaluated based on a drive feeling that a driver sensed. The results of the test are shown in Table 2.

TABLE 2

|  | Embodiment 5 | Comparative tire 4 | Comparative tire 5 |
| --- | --- | --- | --- |
| On-ice braking performance | 115 | 100 | 95 |
| Driving stability | 100 | 100 | 90 |

Note 1:
Values in the table are relative indexes with respect to the values of Comparative tire 4.
Note 2:
Values representing braking performance are indexes which were obtained from the inverses of the measured distances.

As described above, in the studless tires according to the present invention, each of the block-shaped island portions has first and second sipes. Each first sipe extends from a first lateral end facing a first main groove and traverses a first edge region in a substantially axial direction so as to reach a first interface between the first edge region and the central region of the island portion where the first sipe branches into two branch segments, thereby forming a fork-like shape. Each of these branch segments traverses the central region of the island portion and reaches a point near a second interface between an opposite second edge region and the central region of the island portion. Each second sipe extends from a second lateral end of the island portion facing a second main groove and traverses the second edge region so as to extend into the central region of the island portion in the axial direction. By these first and second sipes, the central region of each island portion is circumferentially divided into a larger number of island elements compared to the edge regions thereof. Therefore, even when the edge component within each island portion is increased, the stiffness of each island portion can be maintained. This enhances the on-ice performance of the tire while preventing block chipping and decrease of driving stability, which have been considered to be problems which would occur if the edge component is increased.

Figure 16:
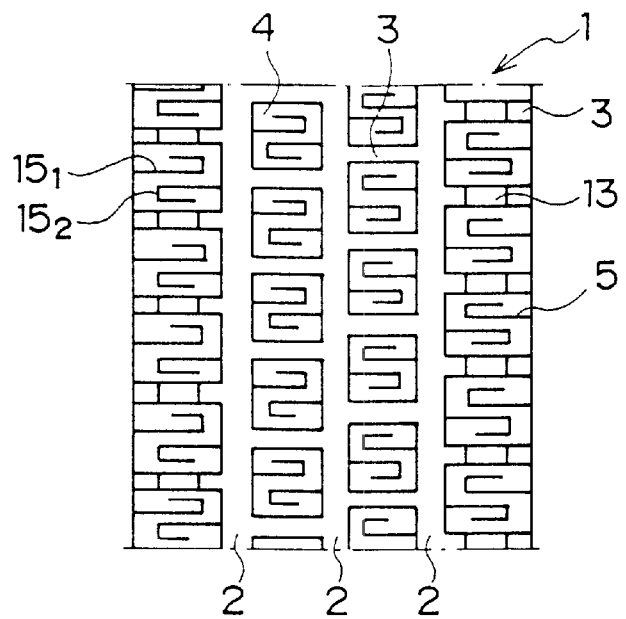
FIG. 16 is a plan view of the tread of a studless pneumatic tire according to a tenth embodiment of the present invention.
Figure 17:
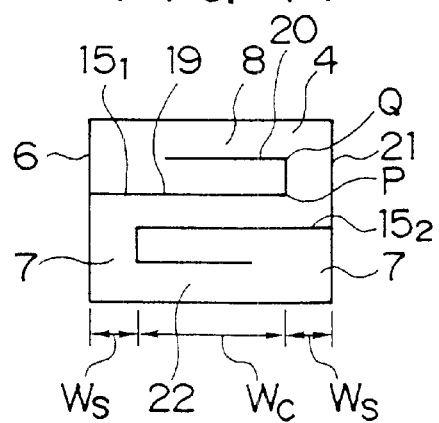
FIG. 17 is an enlarged plan view of an island portion of the tread according to the tenth embodiment.

FIG. 16 shows a plan view of the tread of a studless pneumatic tire according to a tenth embodiment of the present invention, and FIG. 17 shows an enlarged plan view of an island portion shown in FIG. 16.

The studless tire according to the tenth embodiment has a plurality of block-shaped island portions 4 formed on a cylindrical tread 1 extending between a pair of sidewalls (not shown). The island portions 4 are separated by a plurality of main grooves 2 extending in the circumferential direction as well as by many lug grooves 3. Each island portion 4 has sipes 5 extending parallel to the center axis of the tire. The sipes 5 include hook-shaped first and second sipes $15_1$ and $15_2$. Each first sipe $15_1$ has an extension segment 19 and a return segment 20. The extension segment 19 of the first sipe $15_1$ extends from a first lateral end 6 of the island portion 4 facing a main groove 2 so as to traverse a first edge region 7 and a central region 8 of the island portion 4 in the axial direction. One end of the return segment 20 of the first sipe $15_1$ is turned back at the interface between the central region 8 and a second edge region 7 or in the vicinity thereof, and the other end of the return segment 20 is terminated within the central region 8. Each second sipe $15_2$ also has an extension segment 19 and a return segment 20. The extension segment 19 of the second sipe $15_2$ extends from a second lateral end 21 of the island portion 4 facing another main groove 2 so as to traverse the second edge region 7 and the central region 8 of the island portion 4 in the axial direction. One of the return segment 20 of the second sipe $15_2$ is turned back at the interface between the central region 8 and the first edge region 7 or in the vicinity thereof, and the other end of the return segment 20 is terminated within the central region 8. These first and second sipes $15_1$ and $15_2$ divide the central region 8 of each island portion 4 in a larger number of island portions compared to the edge regions 7 thereof.

The tire according to the present embodiment may have a reinforced structure. In detail, a radial carcass of a single or a few plies is disposed between a pair of sidewalls. In each ply, textile cords such as polyester cords or rayon cords are disposed such that they intersect the equatorial plane of the tire at substantially right angles. Also, a belt structure is disposed radially outward of the radial carcass at the crown portion thereof. The belt structure comprises a plurality (usually two) of plies each of which comprises non-extensible cords such as steel cords oriented obliquely at a small angle with respect to the equatorial plane and which are superposed such that their cords intersect one another. Moreover, an auxiliary ply is formed around them by circumferentially and spirally winding a strip. The strip comprises a plurality of heat-shrinkage textile cords such as nylon cords disposed therein and rubberized.

In the embodiment shown in FIGS. 16 and 17, the extension segments 19 of the hook-shaped first and second sipes 151 and $15_2$ extending from the opposite lateral ends 6 and 21 are formed side by side so as to extend parallel to each other, passing through the corresponding edge regions 7 and the central region 8 of the island portion 4 in the axial direction. The tips of the respective extension segments 19 are directed in opposite circumferential directions at the respective interfaces between the central region 8 and the edge regions 7 and are then directed in the axial direction, thereby forming the return segments 20. The return segments 20 extend parallel to the extension segments 19 so as to reach corresponding points near the interfaces between the central region 8 and the edge regions 7. As a result, each of the edge regions 7 of the island portion 4 is divided into two, while the central region 8 of the island portion 7 is divided into five island elements 22 each having a substantially equal circumferential length.

Reference numeral 13 in FIG. 16 denotes a platform formed by raising a portion of the bottom of each lug groove 3 such that the platform 13 corresponds to the central region 8 of the island portion 4. When this platform 13 is provided, the circumferential stiffness of the island portion 4 with in the central region 8 can be increased a round the position corresponding to the platform 13.

In the present embodiment, it is preferred that the width $W_S$ of each of the edge regions 7 of each island portion 4 be 1/9–1/3 of the entire width of the island portion 4, and that the width $W_C$ of the central region 8 therefore be 1/3–7/9 of the entire width of the island portion 4.

Each of the hook-shaped sipes may be curved at points P and Q without being bent at right angles, so as to change its extending direction in the axial direction and enter the central region 8.

The shapes of the sipes 5 are not limited to the straight shapes shown in FIGS. 16–17, and they may have zigzag shapes or wavy shapes.

Insofar as the purpose of the return segments 20 can be achieved, each of them may be extended to the other lateral end 6 or 21 while traversing the corresponding edge region 7 without stopping its extension at the interface between the central region 8 and the edge region 7. In this case, the depth of the tip portion of each return segment is reduced.

Figure 18:
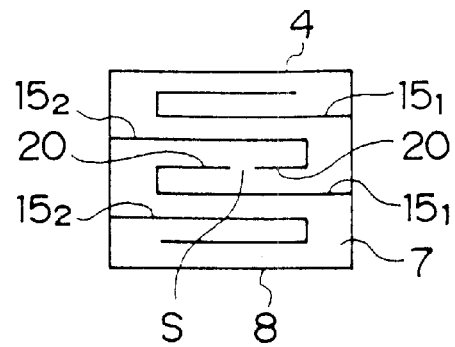
FIG. 18 is a plan view of an island portion according to an eleventh embodiment of the present invention.

FIG. 18 shows a plan view of an island portion according to an eleventh embodiment of the present invention.

In the present embodiment, two pairs of hook-shaped first and second sipes $15_1$ and $15_2$ are provided so as to divide each edge region 7 into three and divide the central region 8 into eight island elements 22 each having a substantially equal length. In the present embodiment, the return segments 20 of the first and second sipes $15_1$ and $15_2$ located at the center of the island portion in the circumferential direction exist on a common line, while forming a small space S between the tips thereof.

In the present embodiment, the first and second sipes $15_1$ and $15_2$ in each pair are turned back at the interfaces between the central region and the edge regions. However, they may be turned back at positions offset from the interfaces in the axial direction.

Figure 19:
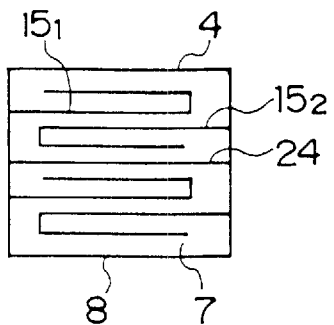
FIG. 19 is a plan view of an island portion according to a twelfth embodiment of the present invention.

FIG. 19 shows a plan view of an island portion according to a twelfth embodiment of the present invention.

In the present embodiment, an additional sipe 24 is provided which traverses the island portion 4 at a circumferentially central position thereof, and a pair of first and second sipes $15_1$ and $15_2$ are provided on each side of the additional sipe 24 in the circumferential direction. Thus, each edge region 7 is divided into four, and the central region 8 is divided into ten island elements 22 each having a substantially equal length.

Figure 20:
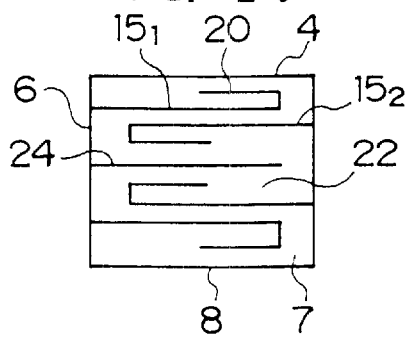
FIG. 20 is a plan view of an island portion according to a thirteenth embodiment of the present invention.

FIG. 20 shows a plan view of an island portion according to a thirteenth embodiment of the present invention.

In the present embodiment, an additional sipe 24 is provided which extends from the first lateral end 6 of the island portion 4 in the axial direction so as to pass through the first edge region 7, thereby reaching the interface between the central region 8 and the second edge region 7. Also, a pair of modified first and second sipes $15_1$ and $15_2$ are provided on each side of the additional sipe 24 in the circumferential direction. The tips of the return segments 20 of the modified sipes $15_1$ and $15_2$ extend only to the center of the island portion 4 in the axial direction. Thus, one of the edge regions 7 is divided into three, the other of the edge regions 7 is divided into four, and the central region 8 is divided into ten long and short island elements 22.

Figure 21:
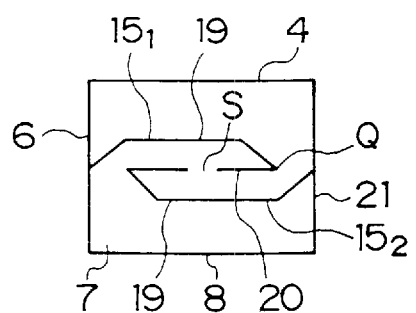
FIG. 21 is a plan view of an island portion according to a fourteenth embodiment of the present invention.

FIG. 21 shows a plan view of an island portion according to a fourteenth embodiment of the present invention.

In the present embodiment, a pair of modified first and second sipes $15_1$ and $15_2$ are used. The extension segment 19 of each sipe, starting from one lateral end 6 or 21, is extended obliquely to the interface between one edge region 7 and the central region 8, and then extended in the axial direction within the central region to a point in the vicinity of the other edge region 7. The extension segment 19 is again extended obliquely to a point Q on the other interface between the central region 8 and the other edge region 7, and then bent so as to form a return segment 20 running in the axial direction. Thus, each edge regions 7 is divided into two, in the circumferential direction, and the central region 8 is divided into four in the circumferential direction. In the present embodiment, a space S is formed between the tip ends of the return segments 20.

Figure 22:
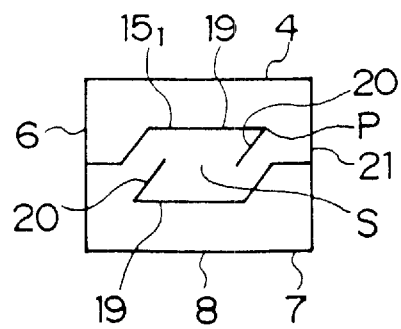
FIG. 22 is a plan view of an island portion according to a fifteenth embodiment of the present invention.

FIG. 22 shows a plan view of an island portion according to a fifteenth embodiment of the present invention.

In the present embodiment, modified first and second sipes $15_1$ and $15_2$ are used. The extension segment 19 of each sipe is extended from one lateral end 6 or 21 in the axial direction to the interface between one edge region 7 and the central region 8, and then extended obliquely toward a lug groove adjacent to the island portion 4. The extension segment 19 is then bent so as to axially pass through the central region 8 to a point P on the other interface between the central region 8 and the other edge region 7, and then bent inward so as to form a relatively short slanted return segment 20. Thus, each edge regions 7 is divided into two in the circumferential direction. Also, the central region 8 is divided into four in areas where the return segments 20 are present, and divided into three in an area where an axial space S is left.

The modified sipes of the present embodiment may be formed such that each straightly extends from the corresponding lateral end 6 or 21 to the point P.

In order to evaluate the performances of the tires according to the above-described tenth (FIG. 16) through fifteenth (FIG. 22) embodiments, the following two tests were carried out.

Test 1: Radial tires having a size of 11R22.5 for trucks and buses were tested to evaluate braking performance on icy surfaces and block chipping.

Test 2: Radial tires having a size of 185/70R13 for passenger cars were tested to evaluate braking performance on icy surfaces and driving stability.

In tires for trucks and buses used in Test 1, island portions were spread on the tread as shown in FIG. 16 (however, each tire had five main grooves), and the sipe layout according to the tenth embodiment shown in FIG. 17 was used in each island portion. The above-described first through third comparative tires having the sipe layouts shown in FIGS. 11–13 were used in Test 1.

The tires of the embodiments and the comparative tires used for Test 1 had identical dimensions, as in Test 1 for the above-described first embodiment. That is, each main groove had a depth of 20 mm, each lug groove had a depth of 15 mm, each island portion had a length of 23 mm and a width of 30 mm, and each sipe had a width of 0.5 mm and a depth of 10 mm. The width $W_C$ of the center region of each island portion was 18 mm, while the width $W_S$ of each edge region of each island portion was 6 mm.

In tires for passenger cars used in Test 2, island portions were spread on the tread as shown in FIG. 16 (however, each tire had five main grooves), and in each island portion the sipe layout according to the eleventh embodiment shown in FIG. 18 was used. The above-described fourth and fifth comparative tires having the sipe layouts shown in FIGS. 14 and 15 were used in Test 2.

The tires of the embodiments and the comparative tires used for Test 2 had identical dimensions, as in Test 2 for the above-described fifth embodiment. That is, each main groove and each lug groove both had a depth of 10 mm, each island portion had a length of 25 mm and a width of 20 mm, and each sipe had a width of 0.3 mm and a depth of 7 mm. The width $W_C$ of the center region of each island portion was 12 mm, while the width $W_S$ of each edge region of each island portion was 4 mm.

As in the case of the first embodiment, each of the tires for trucks and buses was attached to a rim of 22.5×7.50, and air was charged to obtain an internal pressure of 7.0 Kgf/Cm². Braking operation was performed (to a locked state) while a vehicle was traveling on a test course of an icy surface at a speed of 20 Km/H in a loaded state. The distance from a point where braking was started to a point where the vehicle completely stopped was measured. The test for block chipping was performed by driving the vehicle on an asphalt-paved road at an average speed of 60 Km/H over a distance of 20,000 Km and checking the degree of block chipping after the travel.

The results of the test are shown in Table 3.

TABLE 3

|  | Embodiment 10 | Comparative tire 1 | Comparative tire 2 | Comparative tire 3 |
| --- | --- | --- | --- | --- |
| On ice braking performance | 120 | 100 | 105 | 95 |
| Block chipping | none | none | occurred to a slight degree | occurred to a considerable degree |

Note:
Values representing braking performance are indexes which were obtained from the inverses of the measured distances using the value of Comparative tire 1 as a reference.

As in the case of the fifth embodiment, each of the tires for passenger cars was attached to a 13×5½J rim, and air was charged so as to obtain an internal pressure of 1.9 Kgf/Cm². A braking test on icy surfaces was performed in the same manner as for the tires for trucks and buses (initial speed: 20 Km/H). The test for driving stability was performed by driving a vehicle on an asphalt-paved road at speeds of 50–120 km/H so as to simulate travel on ordinary roads and on highways, and the driving stability was evaluated based on a drive feeling that a driver sensed. The results of the test are shown in Table 4.

TABLE 4

|  | Embodiment 11 | Comparative tire 4 | Comparative tire 5 |
| --- | --- | --- | --- |
| On-ice braking performance | 115 | 100 | 95 |
| Driving stability | 100 | 100 | 90 |

Note 1:
Values in the table are relative indexes with respect to the values of Comparative tire 4.
Note 2:
Values representing braking performance are indexes which were obtained from the inverses of the measured distances.

As described above, in the studless tires according to the present invention, each of the block-shaped island portions has first and second sipes. Each first sipe has an extension segment and a return segment. The extension segment of the first sipe extends from a first lateral end of the island portion facing a first main groove to traverse a first edge region and a central region of the island portion in the axial direction. The tip of the extension segment is turned back at the interface between the central region and the second edge region or in the vicinity thereof, thereby forming the return segment of the first sipe. The return segment is terminated within the central region. Each second sipe also has an extension segment and a return segment. The extension segment of the second sipe extends from a second lateral end of the island portion facing a second main groove traverses the second edge region and the central region of the island portion in the axial direction. The tip of the extension segment is turned back at the interface between the central region and the first edge region or in the vicinity thereof, thereby forming the return segment of the second sipe. The return segment is terminated within the central region. By these first and second sipes, the central region of each island portion is circumferentially divided into a larger number of island elements compared to the edge regions thereof. Therefore, even when the edge component within each island portion is increased, the stiffness of each island portion can be maintained. This enhances on-ice performance while preventing block chipping and decrease of driving stability, which have been considered to be problems which would occur if the edge component is increased.

Next, a studless pneumatic tire according to a sixteenth embodiment of the present invention will be described with reference to FIGS. 23–26. The studless pneumatic tire according to the present embodiment is used for trucks and buses, and has the following skeletal structure, for example. A radial carcass of a single or a few plies is disposed between a pair of sidewalls. In each ply, steel cords are disposed such that they intersect the equatorial plane of the tire at substantially right angles. Also, a plurality (usually four) of plies are disposed radially outward of the radial carcass at the crown portion thereof. Each ply comprises non-extensible cords such as steel cords oriented obliquely at a small angle with respect to the equatorial plane and which are superposed such that their cords intersect one another.

The radial carcass extends between a pair of bead cores to form a toroidal shape. A tread is disposed radially outward of the belt ply of the tire.

Figure 23:
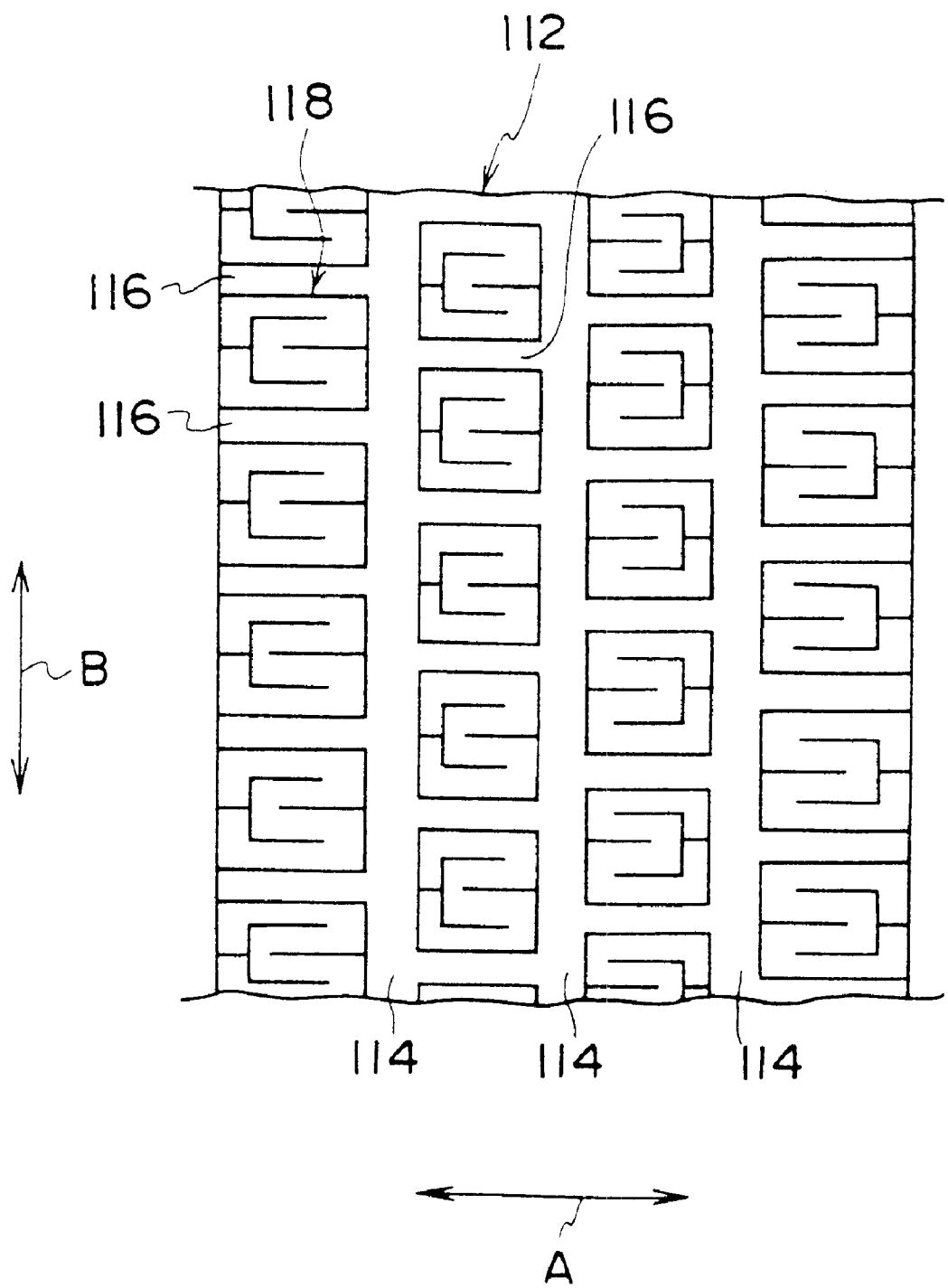
FIG. 23 is a plan view of the tread of a studless pneumatic tire according to a sixteenth embodiment of the present invention.

As shown in FIG. 23, the studless pneumatic tire according to the present embodiment has a plurality of block-shaped island portions 118 formed on a cylindrical tread 112 extending between a pair of sidewalls (not shown). The island portions 118 are separated by a plurality of main grooves 114 extending in the circumferential direction as well as by a plurality of lug grooves 116.

Figure 24:
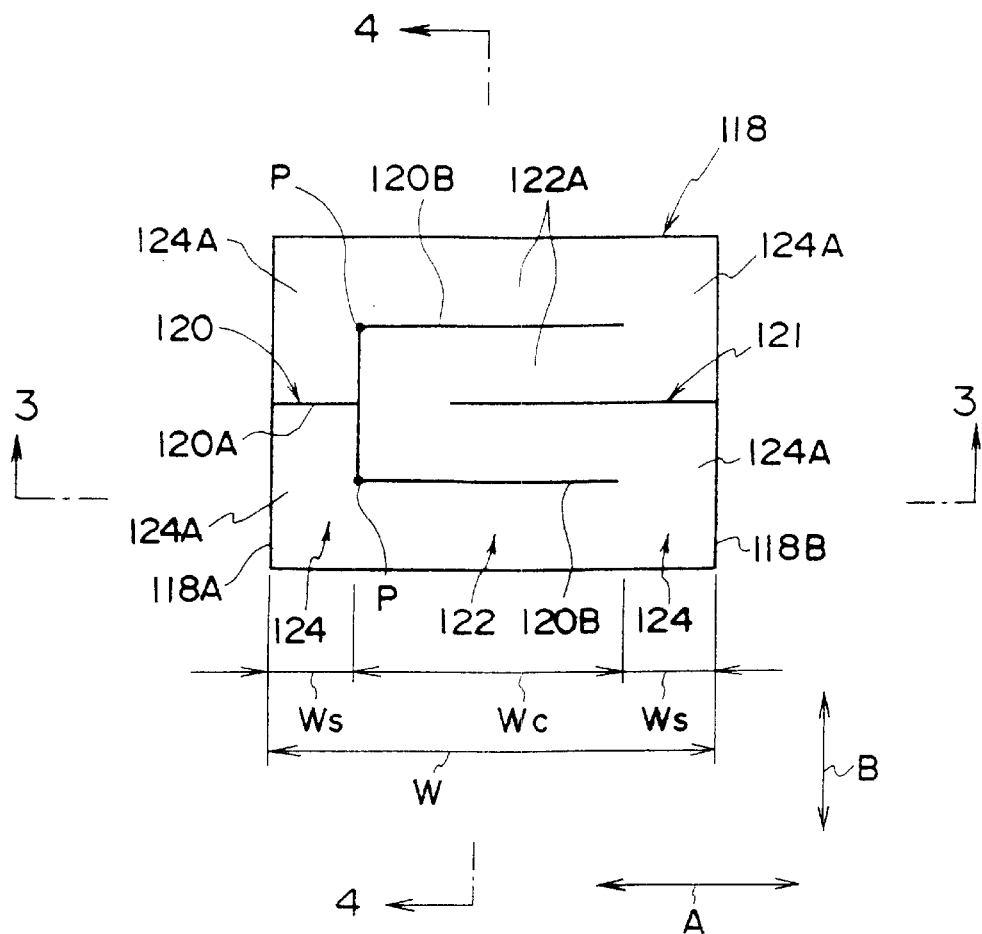
FIG. 24 is a plan view of a block-shaped island portion of the studless pneumatic tire according to the sixteenth embodiment.

Each island portion 118 has a first sipe 120 and a second sipe 121, as shown in FIG. 24.

The first sipe 120 has an edge segment 120A and a pair of branch segments 120B. The edge segment 120A extends in the axial direction (indicated by arrow A) from a first lateral end 118A facing a first main groove 114, toward a second main groove 114 so as to reach an interface between a first edge region 124 and the central region 122 of the island portion 118, where the edge segment 120A branches into opposite circumferential directions (indicated by arrow B) of the tire to form the pair of branch segments 120B. Each of these branch segments 120B bends at a point P so as to run in the axial direction (indicated by arrow A) and then passes through the central region 122, thereby reaching the interface between the central region 122 and a second edge region 124.

The second sipe 121 extending from a second lateral end 118B facing the second main groove 114 extends toward the first main groove 114 in the axial direction, and terminates at a position offset leftward from the center of the central region 122, as shown in FIG. 24. The depths of the first and second sipes 120 and 121 are smaller than those of the main grooves 114.

As a result, each edge region 124 of the island portion 118 is divided into two island elements 124A each having a substantially equal circumferential length, while the central region 122 of the island portion 118 is divided into four island elements 122A each having a substantially equal circumferential length.

In the present embodiment, it is preferred that the width in the axial direction $W_S$ of each edge region of each island portion 118 be 1/9–1/3 of the entire width in the axial direction W of the island portion 118, and that the width in the axial direction $W_C$ of the central region 8 therefore be 1/3–7/9 of the entire width in the axial direction W of the island portion 118.

Figure 25:
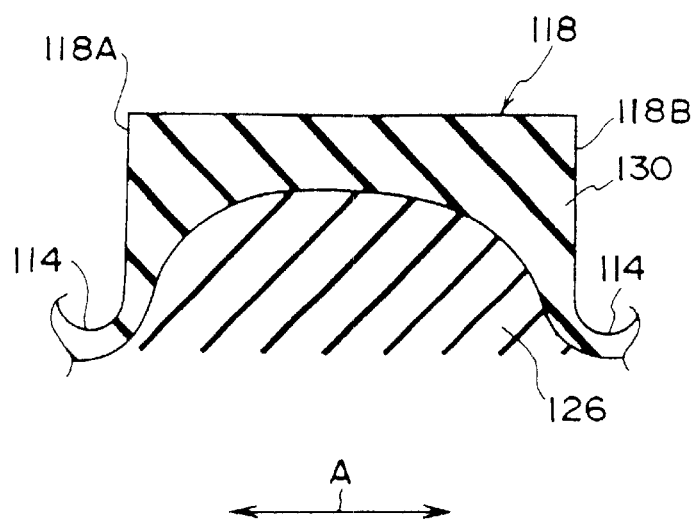
FIG. 25 is a cross-sectional view of the block-shaped island portion shown in FIG. 24 taken along line 3—3 in FIG. 24.
Figure 26:
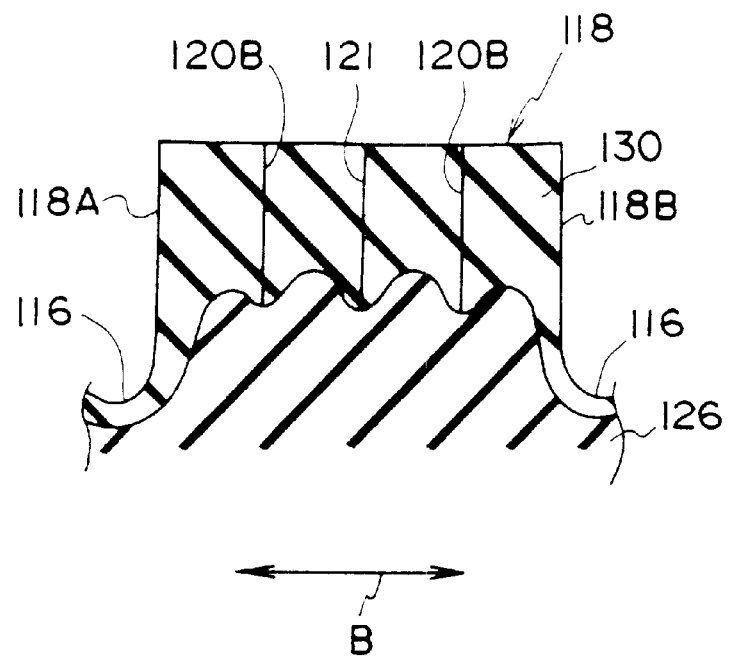
FIG. 26 is a cross-sectional view of the block-shaped island portion shown in FIG. 24 taken along line 4—4 in FIG. 24.

As shown in FIGS. 25 and 26, the tread 112 in the tire of the present embodiment has a cap/base structure, in which the tread 112 consists of a base layer 126 and a cap layer 130.

The hardness of the rubber of the base layer 126 is set to be higher than that of the rubber of the cap layer 130. In order to compensate a decrease in the stiffness of each island portion caused by the formation of sipes, the cross-sectional shape of the base layer 126 is determined such that the volume ratio of the hard rubber for the base layer 126 varies depending on positions. In an area in which the total projected length of portions of the sipes within that area is larger than that in the remaining areas, the volume ratio of the hard rubber for the base layer 126 is larger than that in the remaining areas. In the present embodiment, the hard rubber of the base layer 126 invades into the cap layer 130 in the central region of the block-shaped island portion 118, thereby increasing the volume ratio of the hard rubber in the central region. In the present invention, the rubber of the cap layer 130 has a hardness of 60°, while the rubber of the base layer 126 has a hardness of 65° (JIS (Japanese Industrial Standard), Spring Hardness (Type A)).

Although a plurality of sipes are formed in the central region 122, the stiffness of the block-shaped island portion 118 is maintained, because the volume ratio of the hard rubber for the base layer 126 is increased in the central region 122 so as to compensate decrease of the stiffness of the island in the central region 122. Therefore, block chipping is prevented from occurring in heavy duty tires, such as tires for trucks and buses. In tires for passenger cars, island elements divided by sipes are prevented from bending while cornering, thereby guaranteeing driving stability.

It is possible to make the rubber of the base layer 126 softer than the rubber of the cap layer 130. In this case, in the central region 122, the volume ratio of the rubber of the cap layer 130 is made higher than that of the rubber of the base layer 126.

Next, a studless pneumatic tire for trucks and buses according to a seventeenth embodiment of the present invention will be described with reference to FIG. 27. Portions identical to those shown in the previous embodiment are denoted by the same reference numbers, and a description therefor will be omitted.

Figure 27:
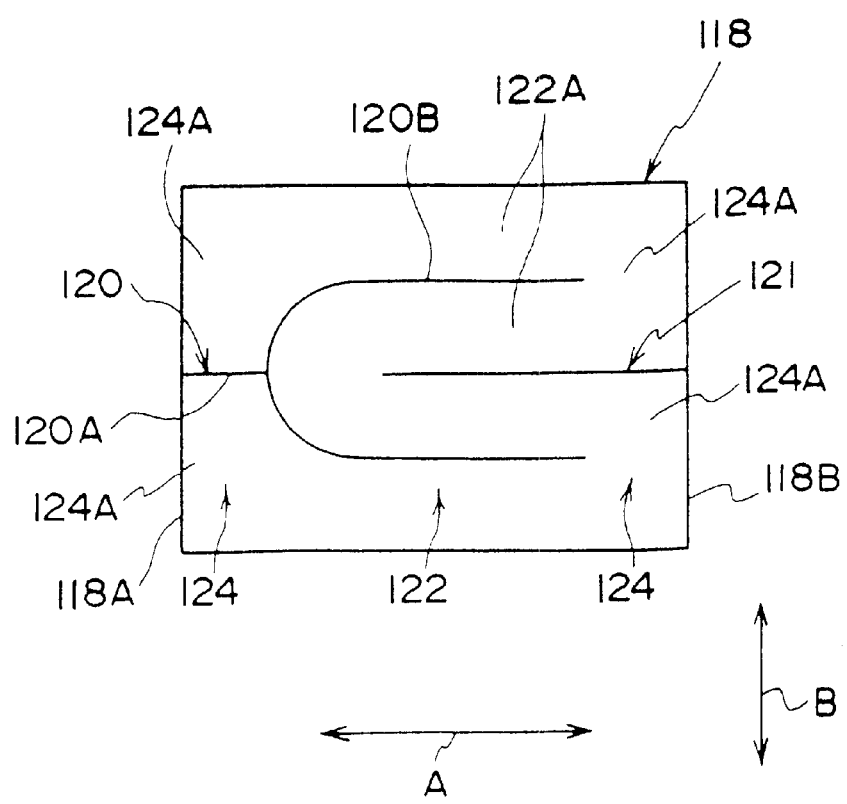
FIG. 27 is a plan view of a block-shaped island portion of a studless pneumatic tire according to a seventeenth embodiment of the present invention.

In contrast to the sixteen embodiment in which each branch segment 120B bends at right angles at point P to run in the axial direction, in the present embodiment, each branch segment 120B curves so as to extend into the central region 122, as shown in FIG. 27.

Next, a studless pneumatic tire for trucks and buses according to the eighteenth embodiment of the present invention will be described with reference to FIG. 28. Portions identical to those shown in the previous embodiment are denoted by the same reference numbers, and a description therefor will be omitted.

Figure 28:
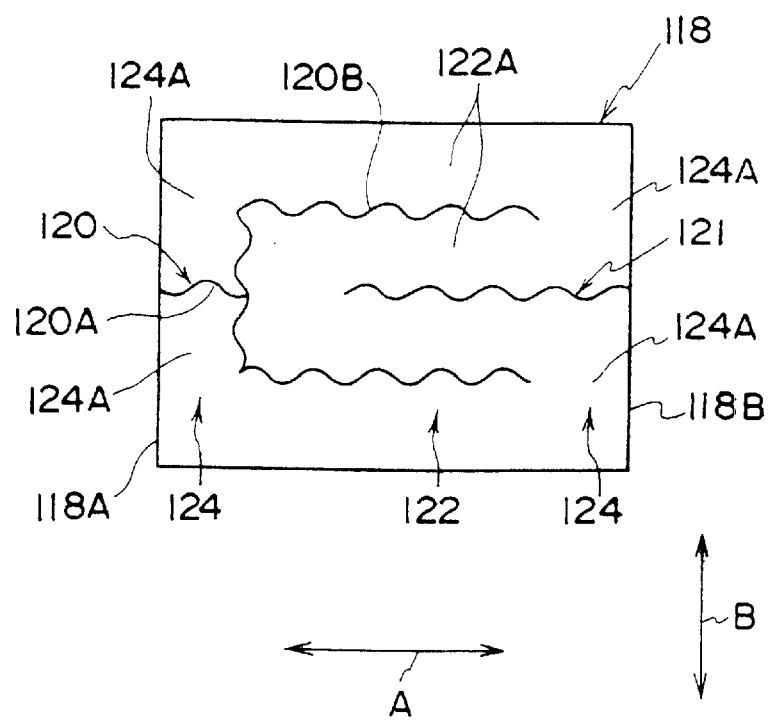
FIG. 28 is a plan view of a block-shaped island portion of a studless pneumatic tire according to an eighteenth embodiment of the present invention.

In contrast to the sixteen embodiment in which each sipe has a straight shape, in the present embodiment, each sipe has a rounded wavy shape, as shown in FIG. 28.

Next, a studless pneumatic tire for trucks and buses according to the nineteenth embodiment of the present invention will be described with reference to FIG. 29. Portions identical to those shown in the previous embodiment are denoted by the same reference numbers, and a description therefor will be omitted.

Figure 29:
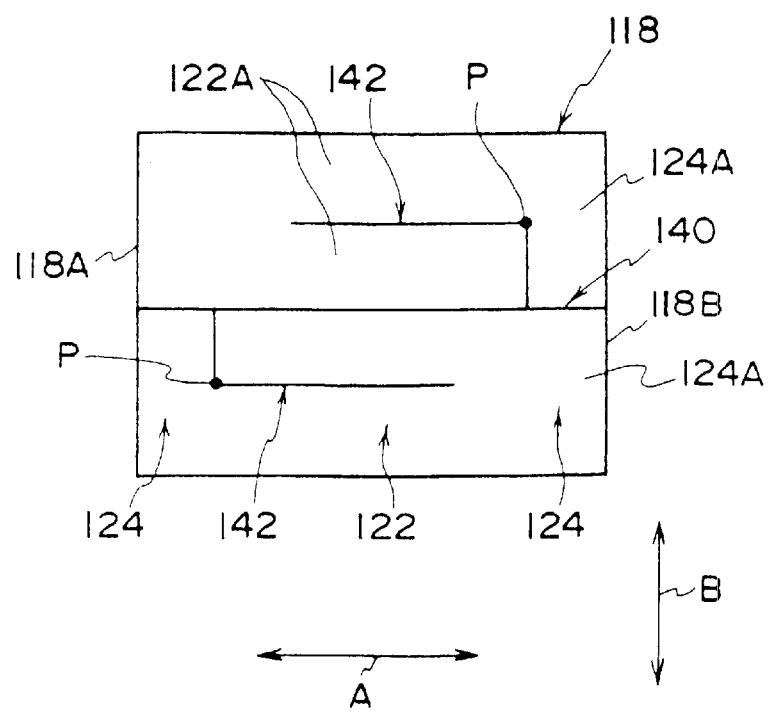
FIG. 29 is a plan view of a block-shaped island portion of a studless pneumatic tire according to a nineteenth embodiment of the present invention.

As shown in FIG. 29, a block-shaped island portion 118 according to the present embodiment has a sipe 140 which is provided at the center of the island portion 118 in the circumferential direction of the tire such that it extends from a first lateral end 118A toward a second lateral end 118B in the axial direction (indicated by arrow A), and a pair of L-shaped sipes 142 which are connected to the sipe 140 and oriented in opposite directions. Each of the sipes 142 extends from the sipe 140 along the interface between the first edge region 124 and the central region 122 in the circumferential direction of the tire, and bends at a point P so as to extend toward the second edge region 124 in the axial direction of the tire, passing through the central region 122.

Next, a studless pneumatic tire for trucks and buses according to the twentieth embodiment of the present invention will be described with reference to FIG. 30. Portions identical to those shown in the previous embodiment are denoted by the same reference numbers, and a description therefor will be omitted.

Figure 30:
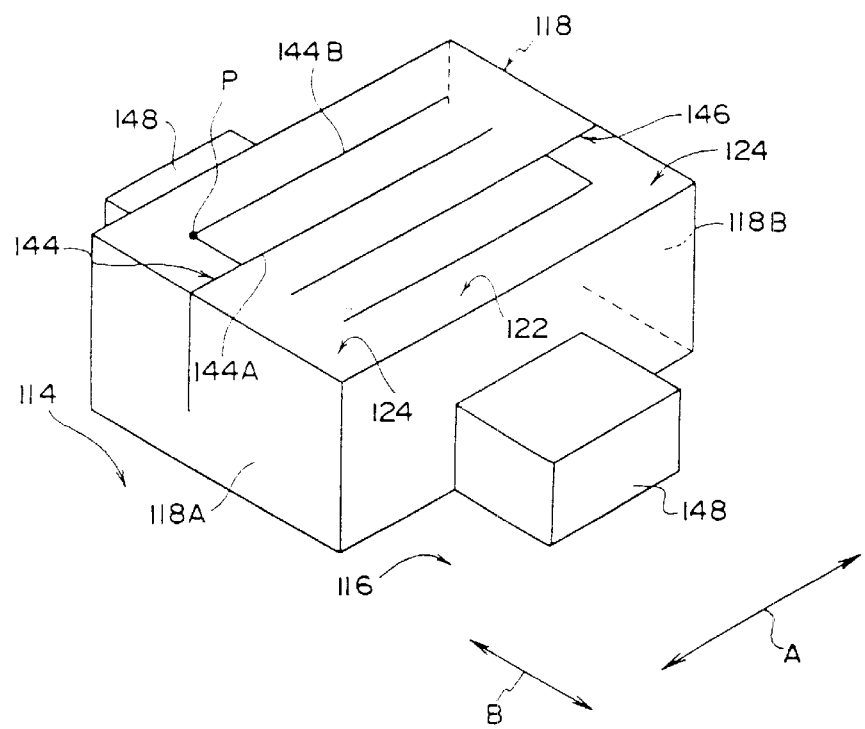
FIG. 30 is a plan view of a block-shaped island portion of a studless pneumatic tire according to a twentieth embodiment of the present invention.

As shown in FIG. 30, a block-shaped island portion 118 according to the present embodiment has a sipe 144 which is composed of a straight segment 144A and an L-shaped segment 144B. The straight segment 144A extends from the first lateral end 118A toward the second lateral end 118B in the axial direction (indicated by arrow A) and terminates at the interface between the second edge region 124 adjacent to the second lateral end 118B and the central region 122. The L-shaped segment 144B extends from the straight segment 144A along the interface between the first edge region 124 adjacent to the first lateral end 118A and the central region 122 in the circumferential direction of the tire, and bends at a point P so as to extend in the axial direction of the tire to the interface between the second edge region 124 adjacent to the second lateral end 118B and the central region 122. Also, a sipe 146 having the same configuration is provided such that it is oriented in the opposite direction with respect to the sipe 144.

On each side of the block-shaped island portion 118 in the circumferential direction of the tire, a platform 148 is provided, which is formed by raising a portion of the bottom of a corresponding lug groove 116 such that the platform faces to the central region 122. By the platforms 148, the circumferential stiffness of the island portion 118 within the central region 122 can be increased around portions connected to the platforms 148.

Next, a studless pneumatic tire for trucks and buses according to the twenty-first embodiment of the present invention will be described with reference to FIG. 31. Portions identical to those shown in the previous embodiment are denoted by the same reference numbers, and a description therefor will be omitted.

Figure 31:
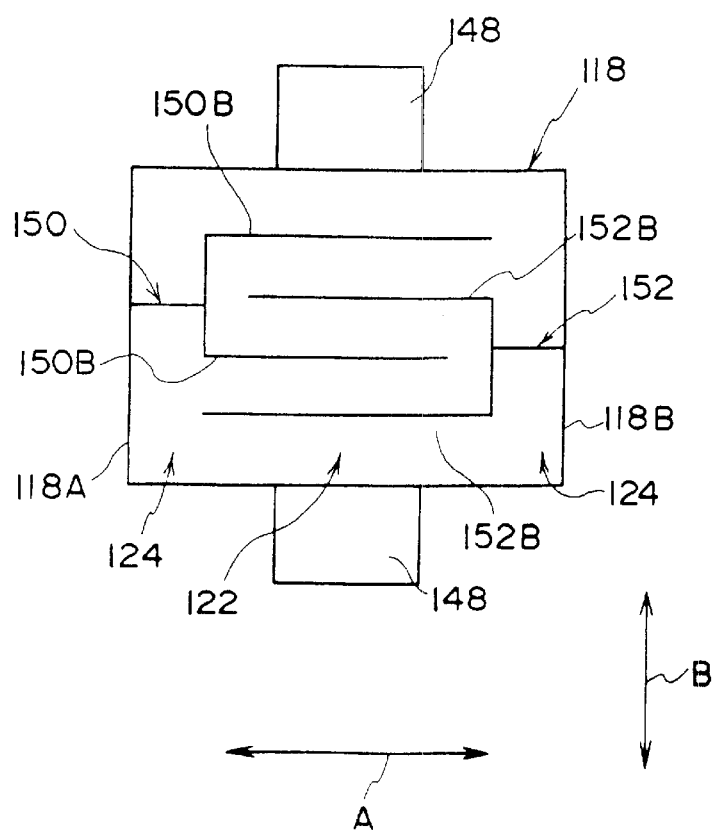
FIG. 31 is a plan view of a block-shaped island portion of a studless pneumatic tire according to a twenty-first embodiment of the present invention.

As shown in FIG. 31, a block-shaped island portion 118 according to the present embodiment has sipes 150 and 152 each having the same configuration as that of the sipe 120 used in the sixteenth embodiment. The sipes 150 and 152 are oriented in opposite directions. One of the branch segments 150B of the sipe 150 and one of the branch segments 152B of the sipe 152 terminate at respective points near the interfaces between the edge regions 124 and the central regions 122 so as to prevent each of the sipes 150 and 152 from intersecting the other sipe. Thus, each edge region 124 is divided into two island elements and the center region 122 is divided into five island elements.

Next, a studless pneumatic tire for trucks and buses according to the twenty-second embodiment of the present invention will be described with reference to FIG. 32. Portions identical to those shown in the previous embodiment are denoted by the same reference numbers, and a description therefor will be omitted.

Figure 32:
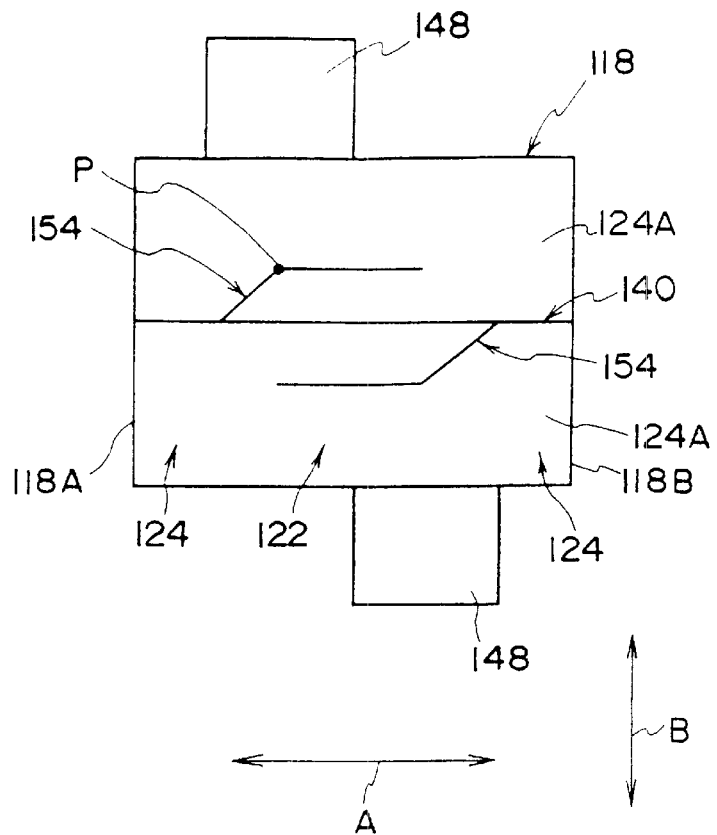
FIG. 32 is a plan view of a block-shaped island portion of a studless pneumatic tire according to a twenty-second embodiment of the present invention.

As shown in FIG. 32, a block-shaped island portion 118 according to the present embodiment has a straight sipe 140 similar to that used in the nineteenth embodiment (see FIG. 29), and a sipe 154 modified from the sipe 142 used in the nineteenth embodiment.

The sipe 154 obliquely extends at an angle smaller than 90° over a predetermined distance from a point on the interface between the first edge region 124 and the central region 122, and then bends at a point P so as to extend toward the second edge region 124 in the axial direction while traversing the central region 122.

Each platform 148 is provided at a position facing the bent portion of the corresponding sipe 154.

Next, a studless pneumatic tire for trucks and buses according to the twenty-third embodiment of the present invention will be described with reference to FIGS. 33 and 34. Portions identical to those shown in the previous embodiment are denoted by the same reference numbers, and a description therefor will be omitted.

Figure 33:
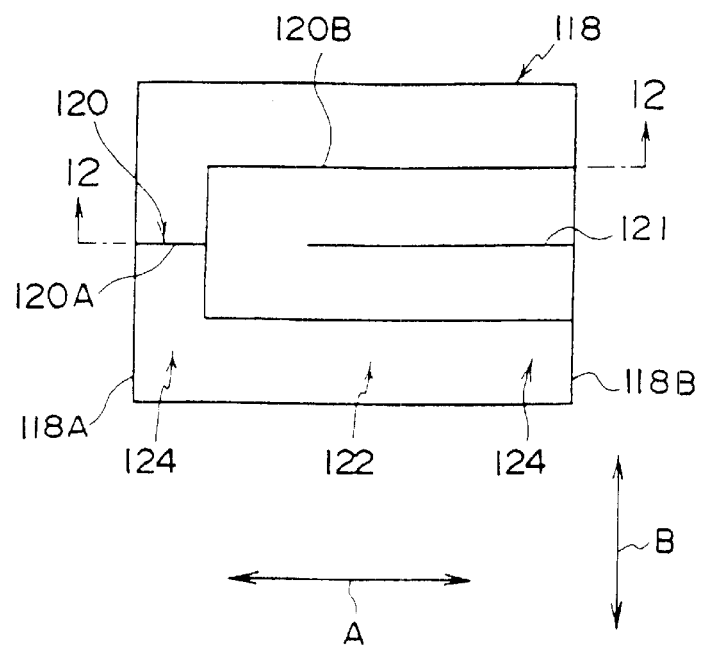
FIG. 33 is a plan view of a block-shaped island portion of a studless pneumatic tire according to a twenty-third embodiment.

As shown in FIG. 33, a block-shaped island portion 118 according to the present embodiment is provided with a straight sipe 120 having branch segments 120B which extend to the second lateral end 118B.

Figure 34:
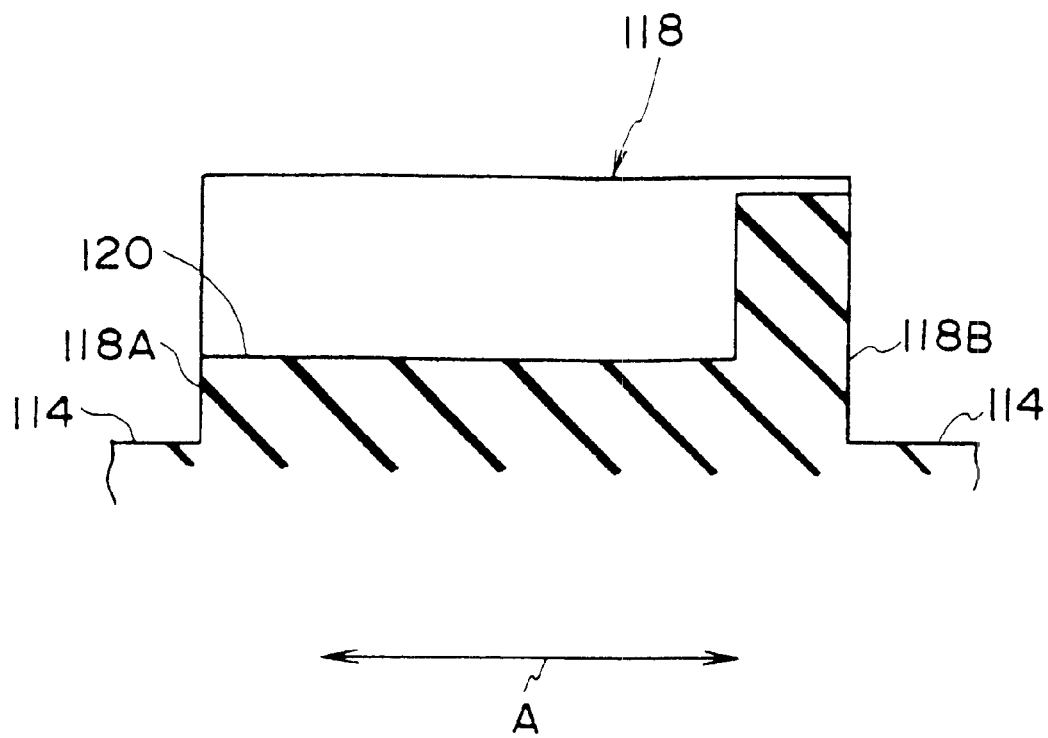
FIG. 34 is a cross-sectional view of the block-shaped island portion shown in FIG. 33 taken along line 12—12 in FIG. 33.

The depth of the sipe 120 according to the present embodiment is not constant but is decreased in a predetermined region corresponding to one end of the branch segment 120B adjacent to the second lateral end 118B, as shown in FIG. 34.

Figure 35:
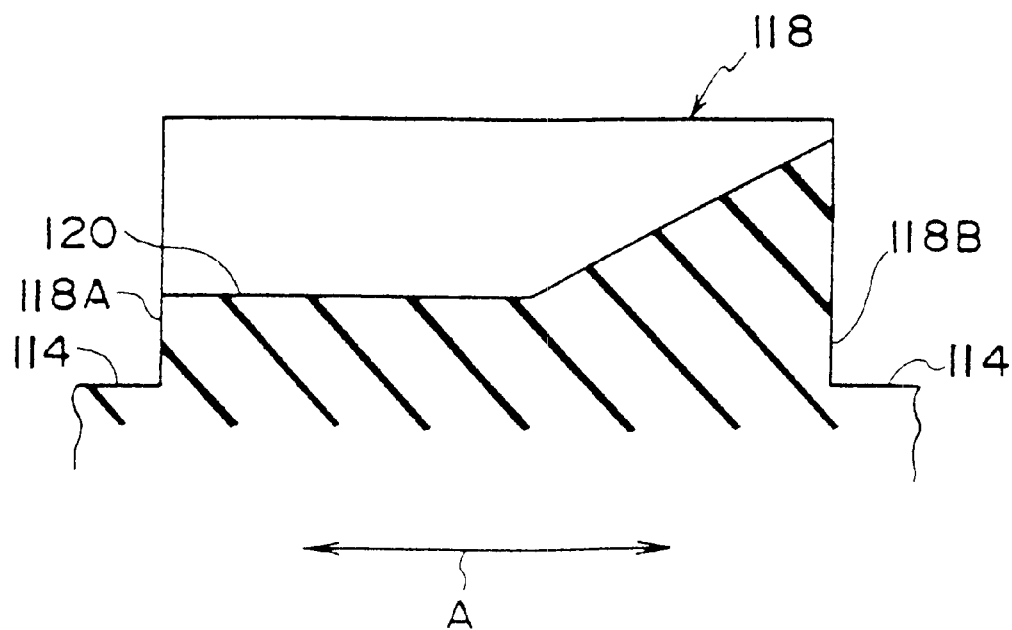
FIG. 35 is a plan view of a block-shaped island portion of a studless pneumatic tire according to a modification of the twenty-third embodiment.

The sipe 120 may be formed such that its depth gradually decreases toward the second lateral end 118B, as shown in FIG. 35.

Next, a studless pneumatic tire for trucks and buses according to the twenty-fourth embodiment of the present invention will be described with reference to FIG. 36. Portions identical to those shown in the previous embodiment are denoted by the same reference numbers, and a description therefor will be omitted.

Figure 36:
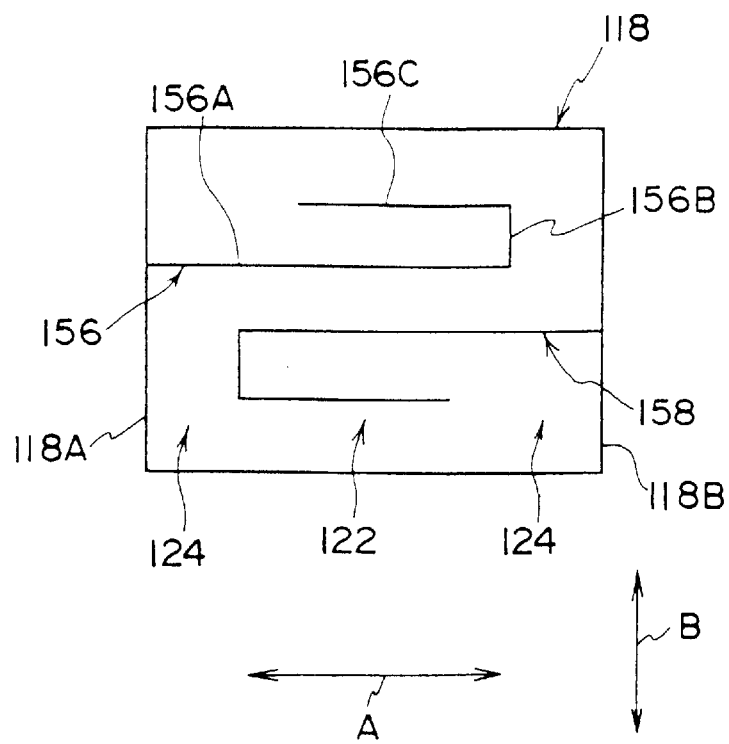
FIG. 36 is a plan view of a block-shaped island portion of a studless pneumatic tire according to a twenty-fourth embodiment of the present invention.

As shown in FIG. 36, a block-shaped island portion 118 according to the present embodiment has hook-shaped sipes 156 and 158.

The sipe 156 consists of segments 156A, 156B and 156C. The segment 156A extends from the first lateral end 118A toward the second lateral end 118B of the bock-shaped island portion 118 in the axial direction (indicated by arrow A) and terminates at the interface between the second edge region 124 adjacent to the second lateral end 118B and the central region 122. The segment 156B extends from the tip of the segment 156A in the circumferential direction of the tire. The segment 156C extends from the tip of the segment 156B in the direction parallel to the segment 156A toward the first edge region 124. The sipe 158 has the same configuration as that of the sipe 156 and is oriented in the opposite direction with respect to the sipe 156.

As a result, each edge region 124 of the block-shaped island portion 118 is divided into two in the circumferential direction of the tire, and the central region 122 thereof is divided into five island elements each having a substantially equal length in the circumferential direction of the tire.

Next, a studless pneumatic tire for trucks and buses according to the twenty-fifth embodiment of the present invention will be described with reference to FIG. 37. Portions identical to those shown in the previous embodiment are denoted by the same reference numbers, and a description therefor will be omitted.

Figure 37:
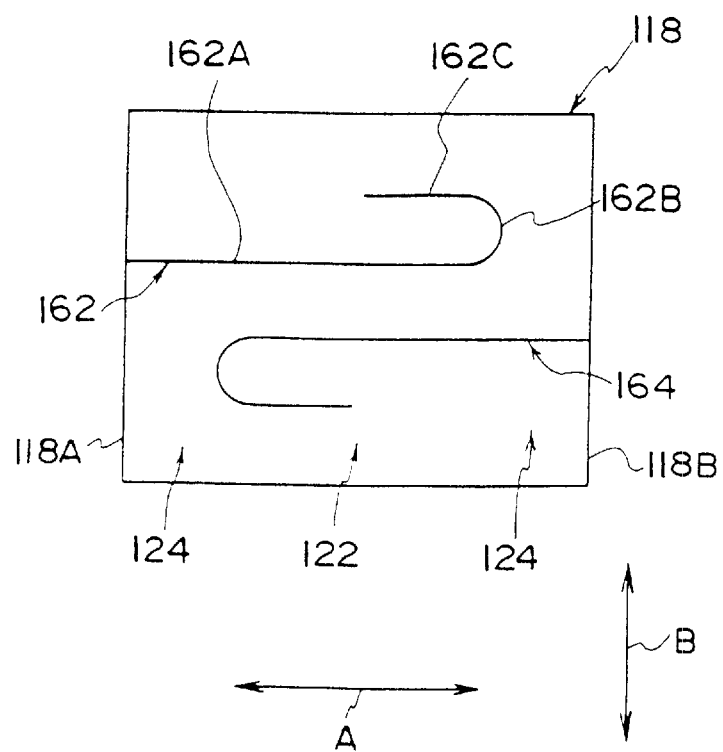
FIG. 37 is a plan view of a block-shaped island portion of a studless pneumatic tire according to a twenty-fifth embodiment of the present invention.

As shown in FIG. 37, a block-shaped island portion 118 according to the present embodiment has hook-shaped sipes 162 and 164.

The sipe 162 consists of segments 162A, 162B and 162C. The segment 162A extends from the first lateral end 118A toward the second lateral end 118B of the bock-shaped island portion 118 in the axial direction (indicated by arrow A) and terminates at the interface between the second edge region 124 adjacent to the second lateral end 118B and the central region 122. The segment 162B has an arcuate shape and extends from the tip of the segment 162A. The segment 162C extends from the tip of the segment 162B in the direction parallel to the segment 156A toward the first edge region 124 and terminates at the center of the island portion 118 in the axial direction of the tire. The sipe 164 has the same configuration as that of the sipe 162 and is oriented in the opposite direction with respect to the sipe 162.

Next, a studless pneumatic tire for trucks and buses according to the twenty-sixth embodiment of the present invention will be described with reference to FIG. 38. Portions identical to those shown in the previous embodiment are denoted by the same reference numbers, and a description therefor will be omitted.

Figure 38:
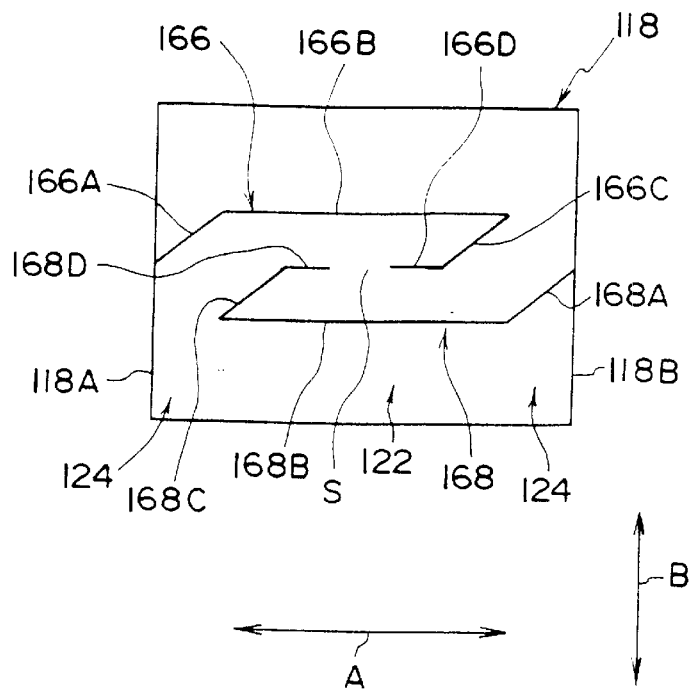
FIG. 38 is a plan view of a block-shaped island portion of a studless pneumatic tire according to a twenty-sixth embodiment of the present invention.

As shown in FIG. 38, a block-shaped island portion 118 according to the present embodiment has hook-shaped sipes 166 and 168.

The sipe 166 consists of segments 166A, 166B, 166C and 166D. The segment 166A obliquely extends from the first end 118A to a point on the interface between the first edge region 124 and the central region 122. The segment 166B extends from the tip of the segment 166A to the second edge region 124 adjacent to the second lateral end 118B. The segment 166C obliquely extends parallel to the segment 166A from the tip of the segment 166B to a point on the interface between the second edge region 124 and the central region 122. The segment 166D extends from the tip of the segment 166C over a predetermined distance toward the first edge region 124. The sipe 168 has the same configuration as that of the sipe 166 and is oriented in the opposite direction with respect to the sipe 166. A space S is provided between the tip of the segment 166D of the sipe 166 and the tip of the segment 168D of the sipe 168.

Next, a studless pneumatic tire for trucks and buses according to the twenty-seventh embodiment of the present invention will be described with reference to FIG. 39. Portions identical to those shown in the previous embodiment are denoted by the same reference numbers, and a description therefor will be omitted.

Figure 39:
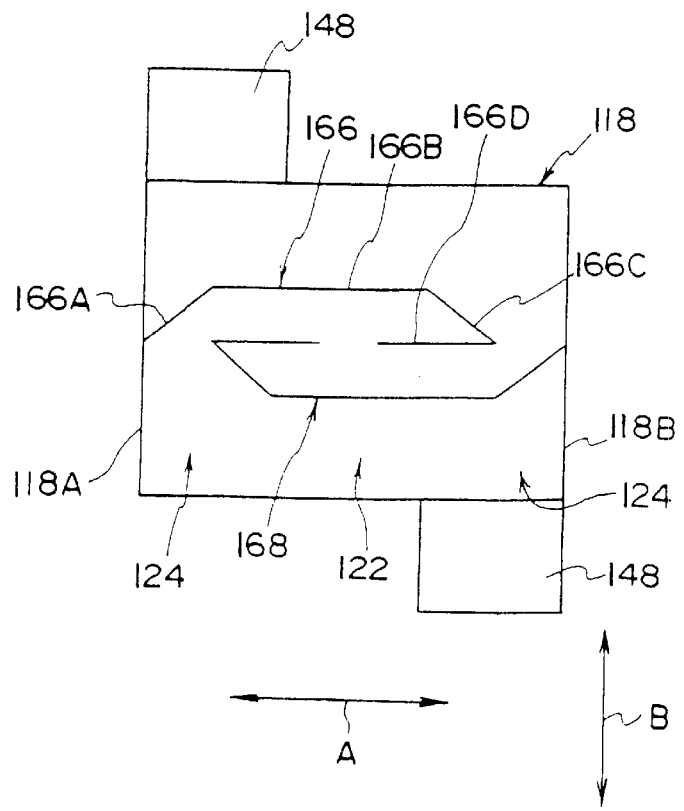
FIG. 39 is a plan view of a block-shaped island portion of a studless pneumatic tire according to a twenty-seventh embodiment of the present invention.

As shown in FIG. 39, a block-shaped island portion 118 according to the present embodiment is a modification of the twenty-sixth embodiment. A platform 148 is provided on each side of the block-shaped island portion 118 in the circumferential direction of the tire such that the platform 148 faces an edge region 124.

Next, a studless pneumatic tire for trucks and buses according to the twenty-eighth embodiment of the present invention will be described with reference to FIGS. 40–42. Portions identical to those shown in the previous embodiment are denoted by the same reference numbers, and a description therefor will be omitted.

Figure 40:
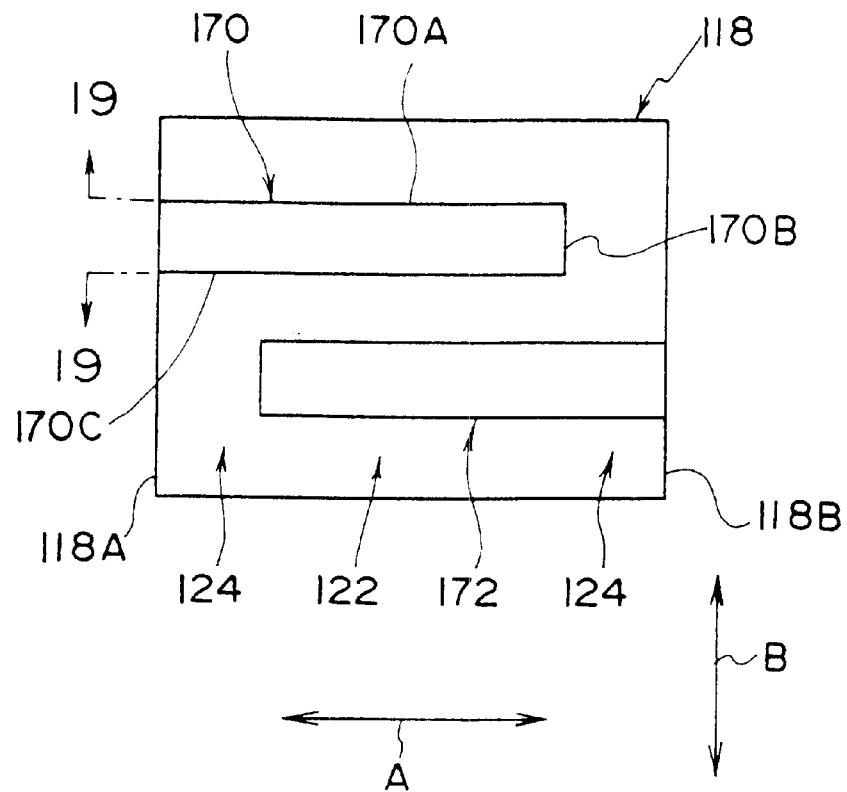
FIG. 40 is a plan view of a block-shaped island portion of a studless pneumatic tire according to a twenty-eighth embodiment of the present invention.

As shown in FIG. 40, a block-shaped island portion 118 according to the present embodiment has sipes 171 and 172.

The sipe 172 consists of segments 172A, 172B and 172C. The segment 172A extends from the first lateral end 118A to the interface between the second edge region 124 adjacent to the second lateral end 118B and the central region 122. The segment 172B extends from the tip of the segment 172B in the circumferential direction of the tire. The segment 172C extends from the tip of the segment 172B to the first lateral end 118A. These segments 172A, 172B and 17C form a generally C-shaped shape.

The sipe 172 has the same configuration as that of the sipe 170 and is oriented in the opposite direction with respect to the sipe 170.

As a result, each edge region 124 of the block-shaped island portion 118 is divided into three in the circumferential direction of the tire, and the central region 122 thereof is divided into five island elements each having a substantially equal length in the circumferential direction of the tire.

Figure 41:
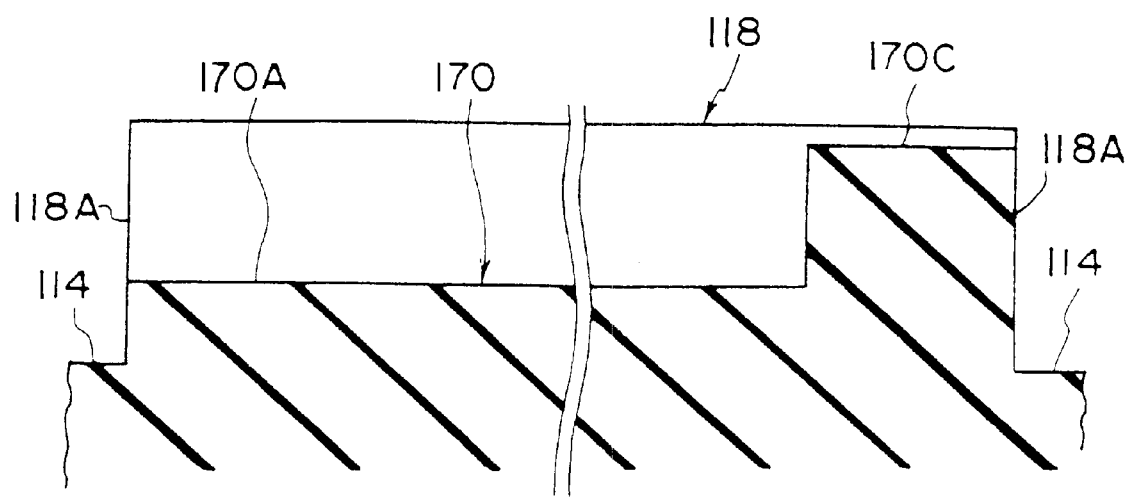
FIG. 41 is a cross-sectional view of the block-shaped island portion shown in FIG. 40 taken along line 19—19 in FIG. 40.

In the present embodiment, the depth of the sipe 170 is not constant but is decreased in a predetermined region corresponding to the end of the sipe 170 located near the center in the circumferential direction of the tire, as shown in FIG. 41. Although not illustrated, the depth of the sipe 172 is also decreased in a predetermined region corresponding to the end of the sipe 172 located near the center in the circumferential direction of the tire. With this configuration, the width of each sipe is prevented from being widened at the end thereof, thereby preventing the divided island elements from bending.

Figure 42:
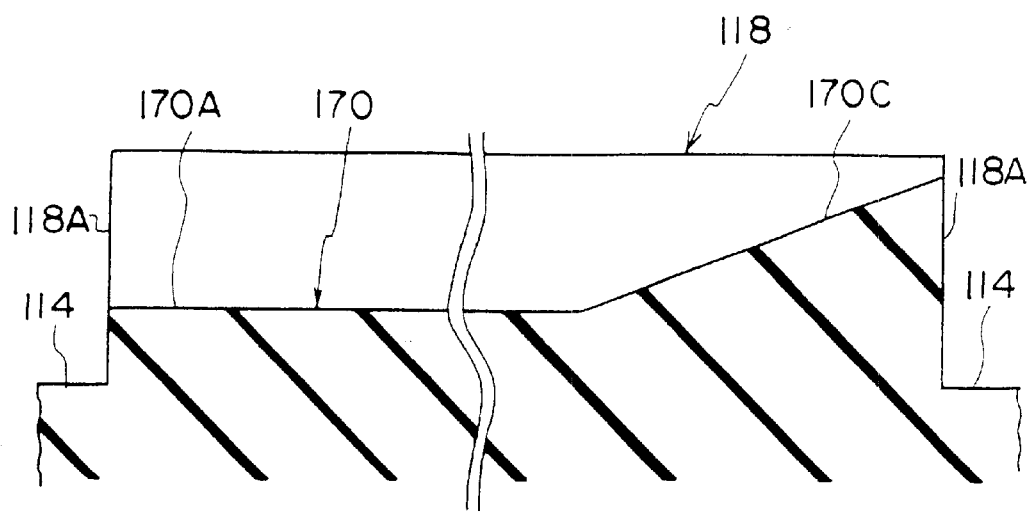
FIG. 42 is a plan view of a block-shaped island portion of a studless pneumatic tire according to a modification of the twenty-eighth embodiment.

The sipes 170 and 172 may be formed such that their depths gradually decrease toward the second lateral end 118B, as shown in FIG. 42.

Next, a studless pneumatic tire for trucks and buses according to the twenty-ninth embodiment of the present invention will be described with reference to FIG. 43. Portions identical to those shown in the previous embodiment are denoted by the same reference numbers, and a description therefor will be omitted.

Figure 43:
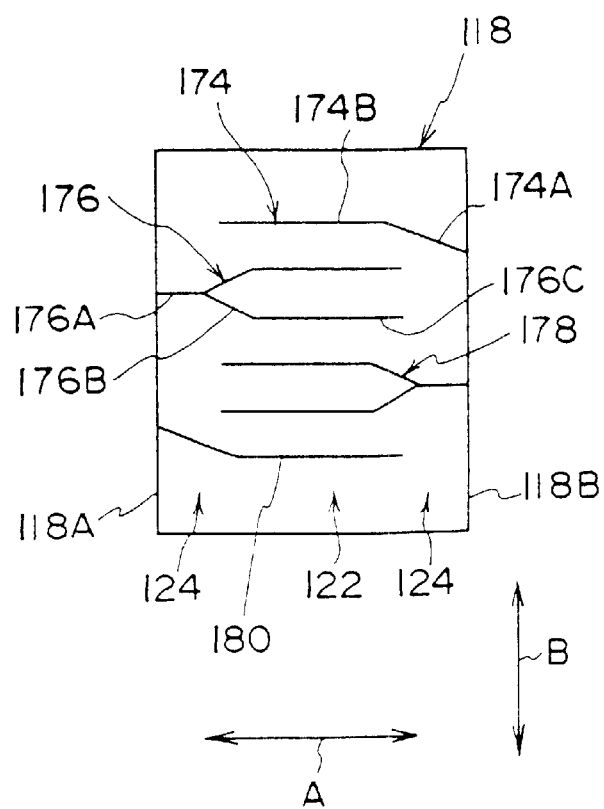
FIG. 43 is a plan view of a block-shaped island portion of a studless pneumatic tire according to a twenty-ninth embodiment of the present invention.

As shown in FIG. 43, a block-shaped island portion 118 according to the present embodiment has sipes 174, 176, 178 and 180 which are separated from one another in the circumferential direction of the tire.

The sipe 174 consists of a segment 174A which obliquely extends from the second end 118B to a point on the interface between the second edge region 124 and the central region 122, and a segment 174B which axially extends from the tip of the segment 174 to the interface between the first edge region 124 adjacent to the first lateral end 118A and the central region 122. The sipe 180 has the same configuration as that of the sipe 174 and is oriented in the opposite direction with respect to the sipe 174.

The sipe 176 consists of a short segment 176A which extends from the first lateral end 118A toward the second lateral end 118B in the axial direction of the tire, a pair of second segments 176B each of which obliquely extends from the tip of the short segment 176A to a point in the vicinity of the interface between the first edge region 124 and the central region 122, and a pair of segments 176C each of which axially extends from the tip of the corresponding segment 176B to the interface between the second edge region 124 adjacent to the second lateral end 118B and the central region 122. The sipe 178 has the same configuration as that of the sipe 176 and is oriented in the opposite direction with respect to the sipe 176.

As a result, each edge region 124 of the block-shaped island portion 118 is divided into three in the circumferential direction of the tire, and the central region 122 thereof is divided into seven island elements in the circumferential direction of the tire.

Next, a studless pneumatic tire for trucks and buses according to the thirtieth embodiment of the present invention will be described with reference to FIG. 44. Portions identical to those shown in the previous embodiment are denoted by the same reference numbers, and a description therefor will be omitted.

Figure 44:
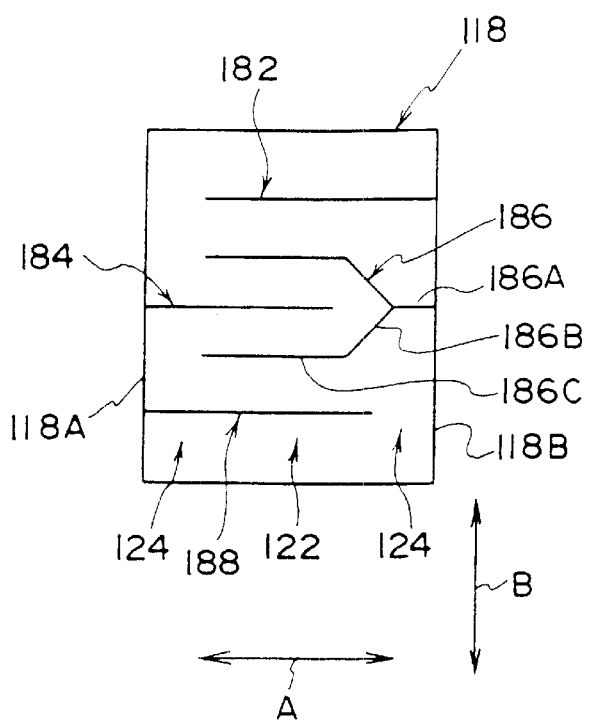
FIG. 44 is a plan view of a block-shaped island portion of a studless pneumatic tire according to a thirtieth embodiment of the present invention.

As shown in FIG. 44, a block-shaped island portion 118 according to the present embodiment has sipes 182, 184, 186 and 188.

The sipe 186 consists of a short segment 186A which extends from the second lateral end 118B toward the first lateral end 118A in the axial direction of the tire, a pair of second segments 186B which obliquely extends from the tip of the short segment 186A such that the space therebetween gradually increases, and a pair of segments 186C each of which axially extends from the tip of the corresponding segment 186B to the interface between the first edge region 124 adjacent to the first lateral end 118A and the central region 122. The sipe 186 is disposed at the center of the block-shaped island portion 118 in the circumferential direction of the tire.

The sipe 184 is also disposed at the center of the block-shaped island portion 118 in the circumferential direction of the tire. This sipe 184 straightly extends from the first lateral end 118A toward the second lateral end 118B in the axial direction of the tire, and terminates before reaching the sipe 186A.

The sipe 182 is disposed on one side of the sipe 186 in the circumferential direction of the tire, and the sipe 188 is disposed on the opposite side of the sipe 186 in the circumferential direction of the tire. The sipe 182 straightly extends from the second lateral end 118B to the interface between the first edge region 124 adjacent to the first lateral end 118A and the central region 122. The sipe 188 straightly extends from the first lateral end 118A to the interface between the second edge region 124 adjacent to the second lateral end 118B and the central region 122.

Figure 45:
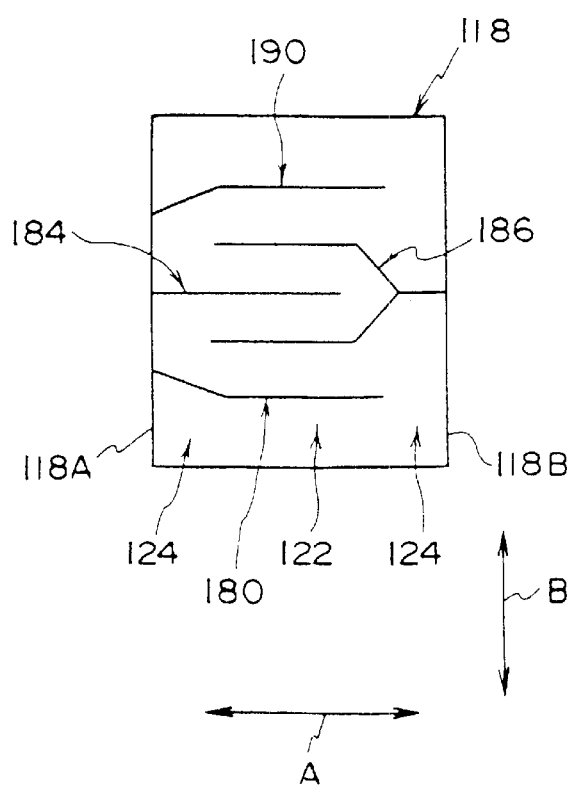
FIG. 45 is a plan view of a block-shaped island portion of a studless pneumatic tire according to a thirty-first embodiment of the present invention.

Next, a studless pneumatic tire for trucks and buses according to the thirty-first embodiment of the present invention will be described with reference to FIG. 45. Portions identical to those shown in the previous embodiment are denoted by the same reference numbers, and a description therefor will be omitted.

A block-shaped island portion 118 according to t he present embodiment is a modification of the above-described thirtieth embodiment. As shown in FIG. 45, sipes 184 and 186 similar to those used in the thirtieth embodiment are formed. Also, a sipe 180 which is similar to that used in the twenty-ninth embodiment is disposed on one side of the sipe 186 in the circumferential direction of the tire, and a sipe 190 which is a mirror image of the sipe 180 is disposed on the opposite side of the sipe 186 in the circumferential direction of the tire.

Next, a studless pneumatic tire for trucks and buses according to the thirty-second embodiment of the present invention will be described with reference to FIG. 46. Portions identical to those shown in the previous embodiment are denoted by the same reference numbers, and a description therefor will be omitted.

Figure 46:
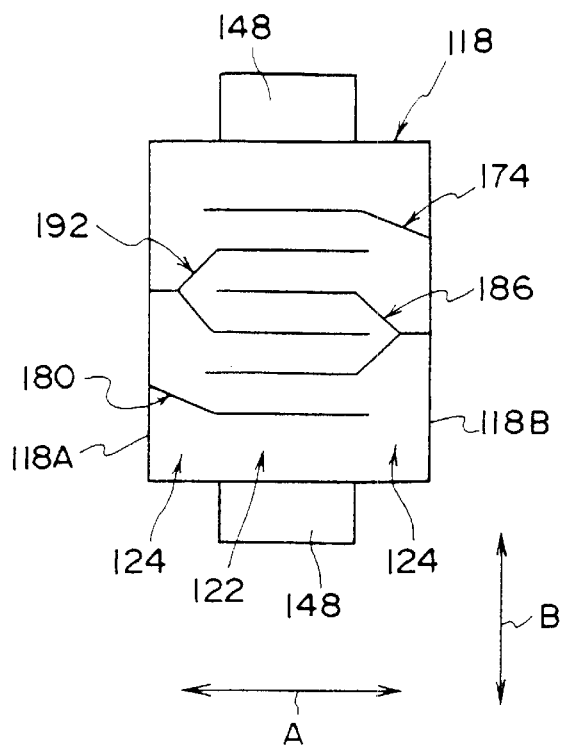
FIG. 46 is a plan view of a block-shaped island portion of a studless pneumatic tire according to a thirty-second embodiment of the present invention.

As shown in FIG. 46, a block-shaped island portion 118 according to the thirty-second embodiment has a sipe 186 which is similar to that used in the above-described thirtieth embodiment and which is formed at the center of the island portion 118 in the circumferential direction thereof. Also, a sipe 192 having the same configuration as that of the sipe 186 is formed such that it is oriented in the opposite direction with respect to the sipe 186. The sipes 192 and 186 are disposed offset from each other by a predetermined distance in the circumferential direction of the tire, thereby preventing them from interfering.

Also, platforms 148 are provided at positions where they face the central region 122.

Next, a studless pneumatic tire for trucks and buses according to the thirty-third embodiment of the present invention will be described with reference to FIG. 47. Portions identical to those shown in the previous embodiment are denoted by the same reference numbers, and a description therefor will be omitted.

Figure 47:
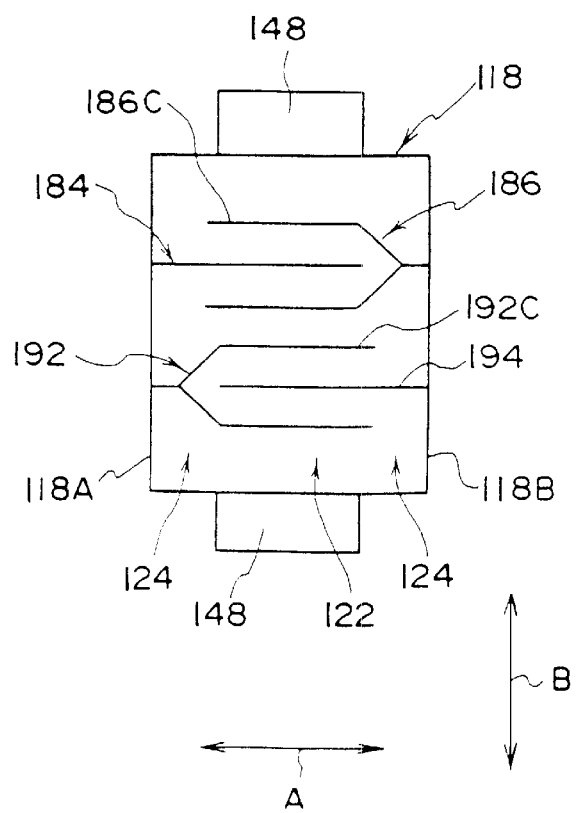
FIG. 47 is a plan view of a block-shaped island portion of a studless pneumatic tire according to a thirty-third embodiment of the present invention.

As shown in FIG. 47, a block-shaped island portion 118 according to the present embodiment has a sipes 192 and 186 which are similar to those used in the above-described thirty-second embodiment. Also, a sipe 184 similar to that used in the above-described thirtieth embodiment is formed, and a sipe 194 having the same configuration as that of the sipe 184 is formed such that it is oriented in the opposite direction with respect to the sipe 184.

The sipes 192 and 186 are disposed offset from each other by a predetermined distance in the circumferential direction of the tire, the sipe 184 is disposed between the segments 186C of the sipe 186, and the sipe 194 is disposed between the segments 192C of the sipe 192.

Also, platforms 148 are provided at positions where they face the central region 122.

Next, a studless pneumatic tire for trucks and buses according to the thirty-fourth embodiment of the present invention will be described with reference to FIG. 48. Portions identical to those shown in the previous embodiment are denoted by the same reference numbers, and a description therefor will be omitted.

Figure 48:
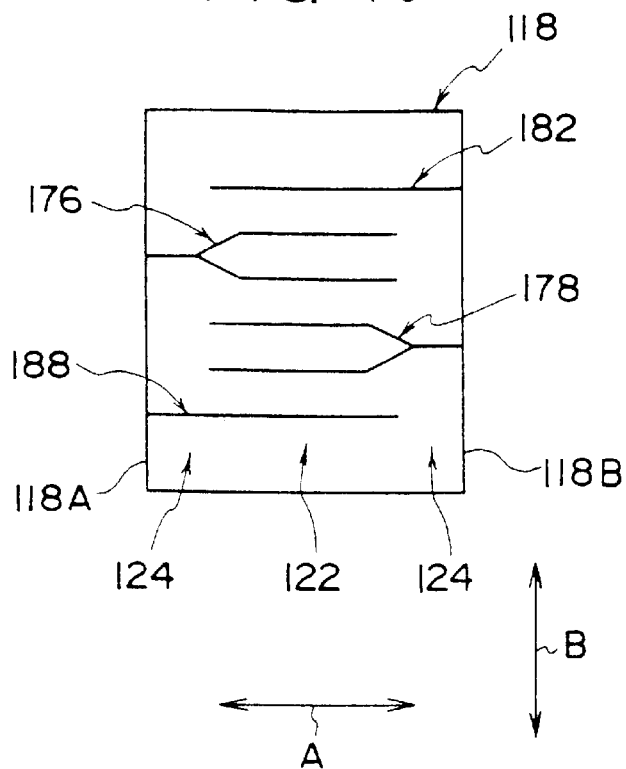
FIG. 48 is a plan view of a block-shaped island portion of a studless pneumatic tire according to a thirty-fourth embodiment of the present invention.

As shown in FIG. 48, a block-shaped island portion 118 according to the thirty-fourth embodiment has a sipes 176 and 178 which are similar to those used in the above-described twenty-ninth embodiment. Also, sipes 182 and 188 similar to those used in the above-described thirtieth embodiment are formed.

Next, a studless pneumatic tire for trucks and buses according to the thirty-fifth embodiment of the present invention will be described with reference to FIG. 49. Portions identical to those shown in the previous embodiment are denoted by the same reference numbers, and a description therefor will be omitted.

Figure 49:
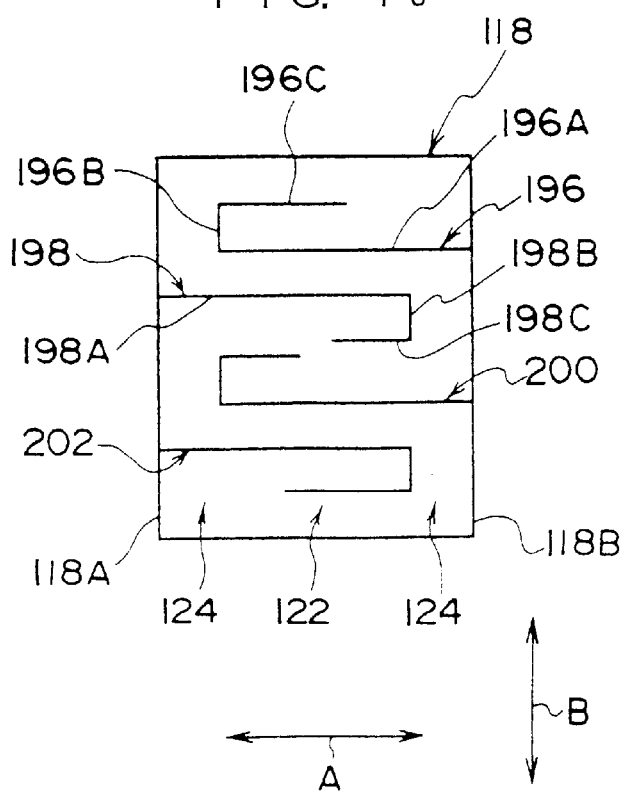
FIG. 49 is a plan view of a block-shaped island portion of a studless pneumatic tire according to a thirty-fifth embodiment of the present invention.

As shown in FIG. 49, a block-shaped island portion 118 according to the present embodiment has hook-shaped sipes 196, 198, 200 and 202.

The sipe 196 consists of segments 196A, 196B and 196C. The segment 196A extends from the second lateral end 118B toward the first lateral end 118A of the bock-shaped island portion 118 in the axial direction (indicated by arrow A) and terminates at the interface between the first edge region 124 adjacent to the first lateral end 118A and the central region 122. The segment 196B extends from the tip of the segment 196A in the circumferential direction of the tire. The segment 196C extends from the tip of the segment 196B in the direction parallel to the segment 196A toward the second lateral end 118B. The sipe 202 has the same configuration as that of the sipe 196 and is oriented in the opposite direction with respect to the sipe 196.

The segment 198A extends from the first lateral end 118A toward the second lateral end 118B of the bock-shaped island portion 118 in the axial direction (indicated by arrow A) and terminates at the interface between the second edge region 124 adjacent to the second lateral end 118B and the central region 122. The segment 198B extends from the tip of the segment 198A in the circumferential direction of the tire. The segment 198C extends from the tip of the segment 198B in the direction parallel to the segment 198A toward the first lateral end 118A. The sipe 200 has the same configuration as that of the sipe 198 and is oriented in the opposite direction with respect to the sipe 198.

Next, a studless pneumatic tire for trucks and buses according to the thirty-sixth embodiment of the present invention will be described with reference to FIG. 50. Portions identical to those shown in the previous embodiment are denoted by the same reference numbers, and a description therefor will be omitted.

Figure 50:
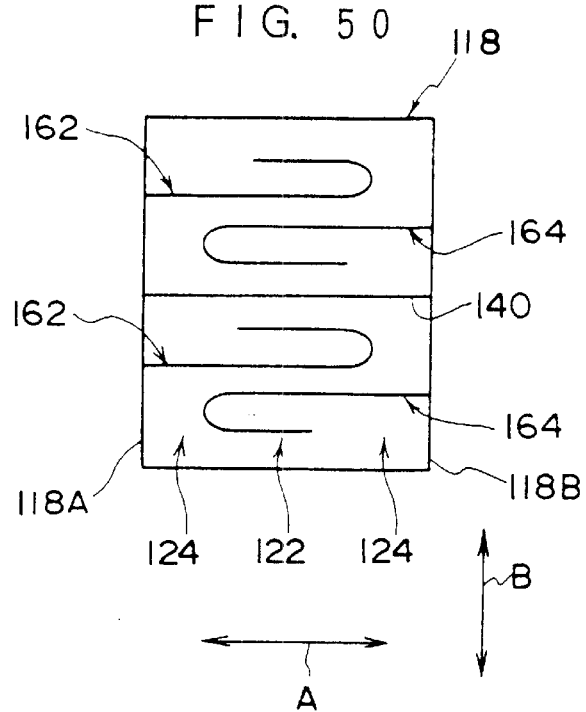
FIG. 50 is a plan view of a block-shaped island portion of a studless pneumatic tire according to a thirty-sixth embodiment of the present invention.

As shown in FIG. 50, a block-shaped island portion 118 according to the present embodiment has a sipes 140 which is similar to that used in the above-described nineteenth embodiment and which is formed at the center of the island portion 118 in the circumferential direction of the tire. Hook-shaped sipes 162 and 164 similar to those used in the above-described twenty-fifth embodiment are formed on each side of the sipe 140 in the circumferential direction of the tire.

Next, a studless pneumatic tire for trucks and buses according to the thirty-seventh embodiment of the present invention will be described with reference to FIG. 51. Portions identical to those shown in the previous embodiment are denoted by the same reference numbers, and a description therefor will be omitted.

Figure 51:
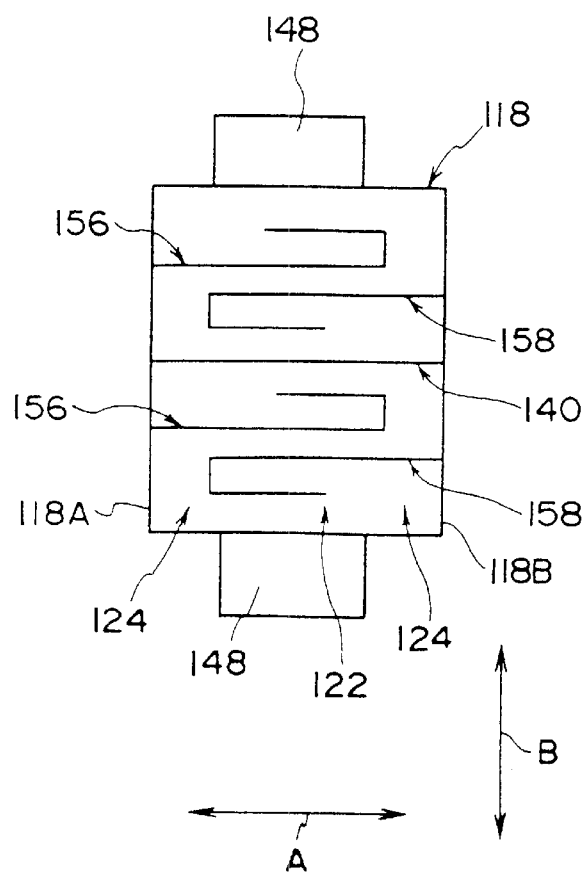
FIG. 51 is a plan view of a block-shaped island portion of a studless pneumatic tire according to a thirty-seventh embodiment of the present invention.

As shown in FIG. 51, a block-shaped island portion 118 according to the present embodiment has a sipes 140 which is similar to that used in the above-described nineteenth embodiment and which is formed at the center of the island portion 118 in the circumferential direction of the tire. Hook-shaped sipes 156 and 158 similar to those used in the above-described twenty-fourth embodiment are formed on each side of the sipe 140 in the circumferential direction of the tire.

Also, platforms 148 are provided at positions where they face the central region 122.

Next, a studless pneumatic tire for trucks and buses according to the thirty-eighth embodiment of the present invention will be described with reference to FIG. 52. Portions identical to those shown in the previous embodiment are denoted by the same reference numbers, and a description therefor will be omitted.

Figure 52:
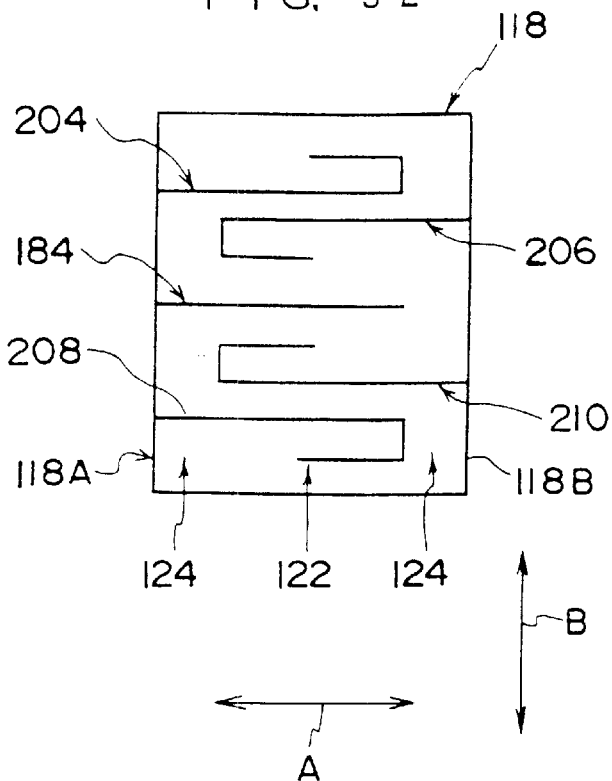
FIG. 52 is a plan view of a block-shaped island portion of a studless pneumatic tire according to a thirty-eighth embodiment of the present invention.

As shown in FIG. 52, a block-shaped island portion 118 according to the present embodiment has a sipes 184 which is similar to that used in the above-described thirtieth embodiment and which is formed at the center of the island portion 118 in the circumferential direction of the tire.

On one side of the sipe 184 in the circumferential direction of the tire, hook-shaped sipes 204 and 206 having shapes similar to those of the sipes 156 and 158 used in the above-described twenty-fourth embodiment are formed. On the other side of the sipe 184, sipes 208 and 210 are disposed which have the same configurations as those of the sipes 204 and 206 and are oriented in the opposite direction with respect to the sipe 204 and 206, respectively.

Tips of sipes 204, 206, 208, 210 are terminated at the central portion of the block-shaped island portion 118 in the axial direction of the tire.

In order to evaluate the performances of the tires according to the above-described sixteenth embodiment (FIG. 23) through thirty-eighth embodiment (FIG. 52), an on-ice braking test, a block chipping test, and a wet performance test were performed using a single kind of tires for truck and buses to which the above-described embodiments were applied and five kinds of comparative tires for trucks and buses. All the tires had a size of 11R22.5.

Further, an on-ice braking test, a wet performance test, and a driving stability test were performed using two kinds of tires for passenger cars to which the above-described embodiments were applied and four kinds of comparative tires for passenger cars. All the tires had a size of 185/70R13.

Test Method

On-ice braking test: Tires to be tested were attached to a vehicle, and abrupt braking was performed (to a locked state) while a vehicle was traveling on an icy test course at a speed of 20 Km/H. The distance from a point where braking was started to a point where the vehicle completely stopped was measured.

Block chipping test: A test driver drove a vehicle on an asphalt-paved road at an average speed of 60 Km/H over a distance of 20,000 Km and the degree of block chipping was examined visually after the travel.

Wet performance test: A test driver drove a vehicle on a wet road and evaluated the performance based on the feeling during the driving.

Driving stability test: A test driver drove a vehicle on a dry road, and evaluated the stability based on the feeling during the driving.

The results of the tests for studless pneumatic tires for trucks and buses are shown in the following Table 5 and the results of the tests for studless pneumatic tires for passenger cars are shown in the following Table 6.

Next, a description will be given of studless pneumatic tires for trucks and buses used for the tests.

Tire 1 of the present invention: a studless pneumatic tire described in the sixteen embodiment (see FIGS. 23–26).

Figure 53:
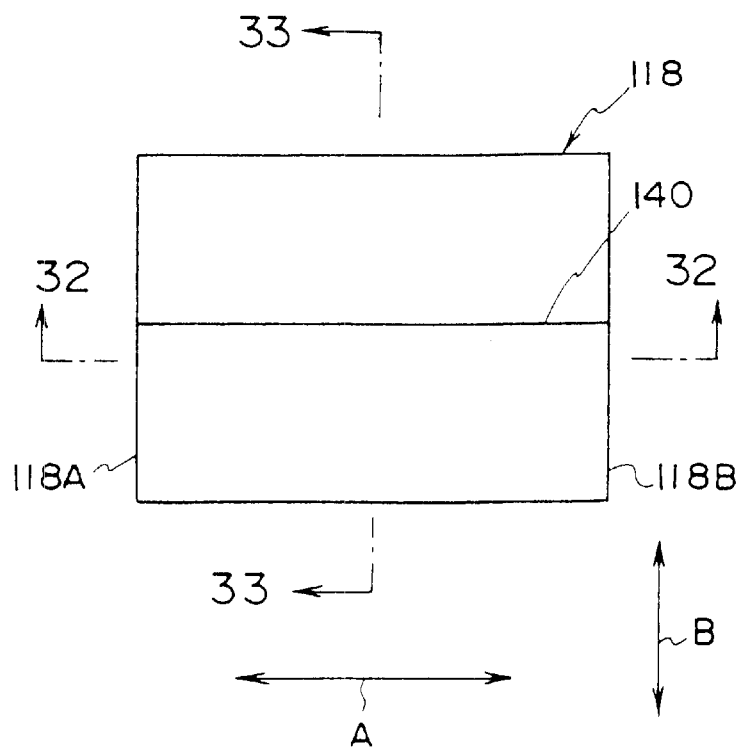
FIG. 53 is a plan view of a block-shaped island portion of a sixth comparative tire.
Figure 54:
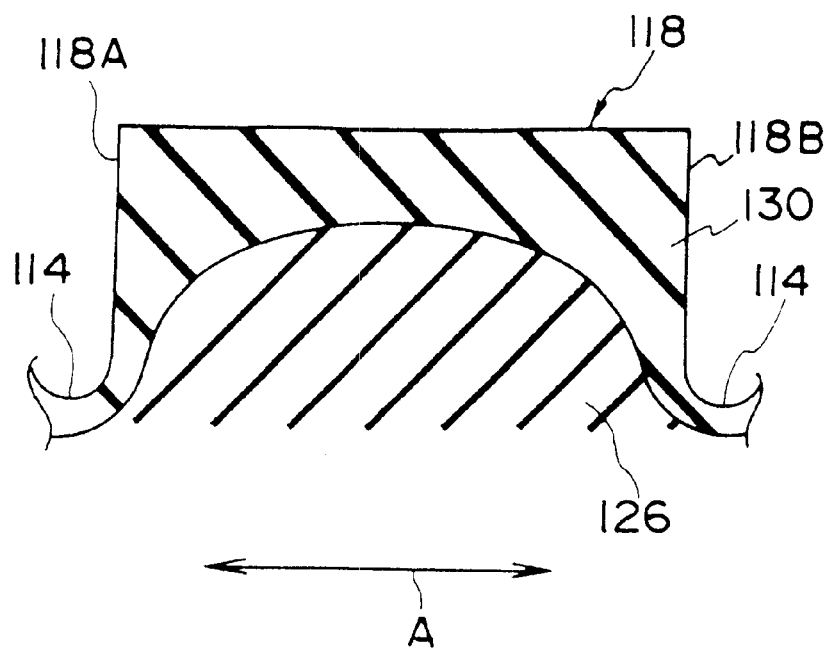
FIG. 54 is a cross-sectional view of the block-shaped island portion shown in FIG. 53 taken along line 32—32 in FIG. 53.
Figure 55:
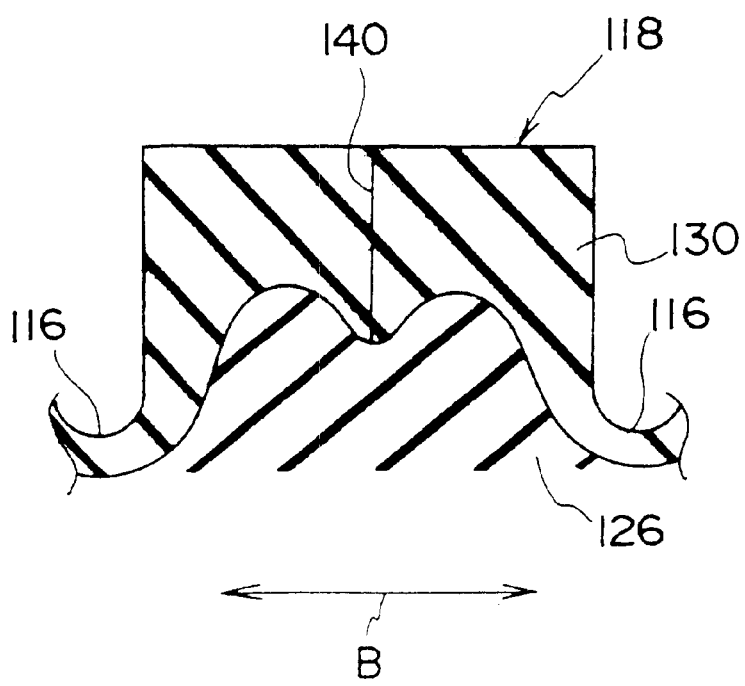
FIG. 55 is a cross-sectional view of the block-shaped island portion shown in FIG. 53 taken along line 33—33 in FIG. 53.

Comparative tire 6: a studless pneumatic tire having block-shaped island portions 118 in each of which a single sipe 140 is formed, as shown in FIG. 53. The rubber of the base layer 126 invades into the cap layer 130 in the central region of the block-shaped island portion 118, as shown in FIG. 54 and FIG. 55.

Comparative tire 7: a studless pneumatic tire having block-shaped island portions 118 each of which has two sipes 212 and 214, as shown in FIG. 56. The sipe 212 extends from the first lateral end 118A to the interface between the second edge region 124 adjacent to the second lateral end 118B and the central region 122. The sipe 214 extends from the second lateral end 118B to the interface between the first edge region 124 adjacent to the first lateral end 118A and the central region 122.

Comparative tire 8: a studless pneumatic tire having block-shaped island portions 118 each of which has three sipes 212 and 214, as shown in FIG. 57. The sipe 214 is provided at the center of the island portion 118 in the circumferential direction of the tire and extends from the second lateral end 118B. The sipes 212 are provided on both sides of the sipe 214 in the circumferential direction of the tire and extend from the first lateral end 118A.

Comparative tire 9: a studless pneumatic tire having block-shaped island portions 118 each of which has the same sipes as those of Tire 1. However, the tread of this tire has a single layer (cap layer only).

Comparative tire 10: a studless pneumatic tire having block-shaped island portions 118 each of which has the same sipes as those of Comparative tire 6. However, the tread of this tire has a single layer (cap layer only).

Tire 1 and Comparative tire 6–10 have the same structure except the designs of their treads 112 (block-shaped island portions 118). Also, all the tires have identical dimensions. That is, the entire width W of each island portion 118 in the widthwise direction of the tire is 30 mm, and the length L of each island portion 118 in the circumferential direction of the tire is 23 mm. Each main groove 114 has a depth of 20 mm, and each lug groove 116 has a depth of 15 mm. Each sipe 120 has a depth of 10 mm and a width of 0.5 mm.

In each tire, the rubber of the cap layer 130 has a hardness of 60°, while the rubber of the base layer 126 has a hardness of 65° (JIS (Japanese Industrial Standard), Spring Hardness (Type A)).

Next, a description will be given of studless pneumatic tires for passenger cars used for the tests.

Tire 2 of the present invention: a studless pneumatic tire described in the twenty-ninth embodiment (see FIG. 43).

Tire 3 of the present invention: a studless pneumatic tire described in the thirty-fifth embodiment (see FIG. 49).

Figure 60:
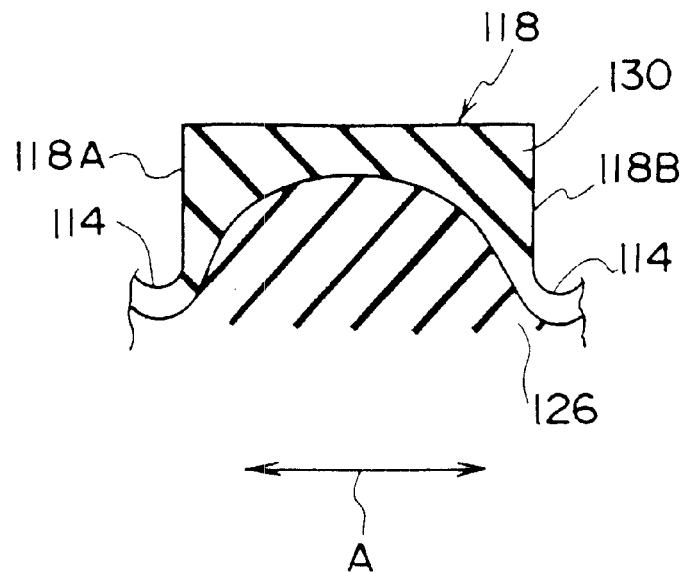
FIG. 60 is a cross-sectional view of the block-shaped island portion shown in FIG. 58 taken along line 38—38 in FIG. 58.

Comparative tire 11: a studless pneumatic tire having block-shaped island portions 118 in each of which two first sipes 212 and two second sipes 214 are alternately formed, as shown in FIG. 58. The rubber of the base layer 126 invades into the cap layer 130 in the central region of the block-shaped island portion 118, as shown in FIG. 59 and FIG. 60.

Figure 61:
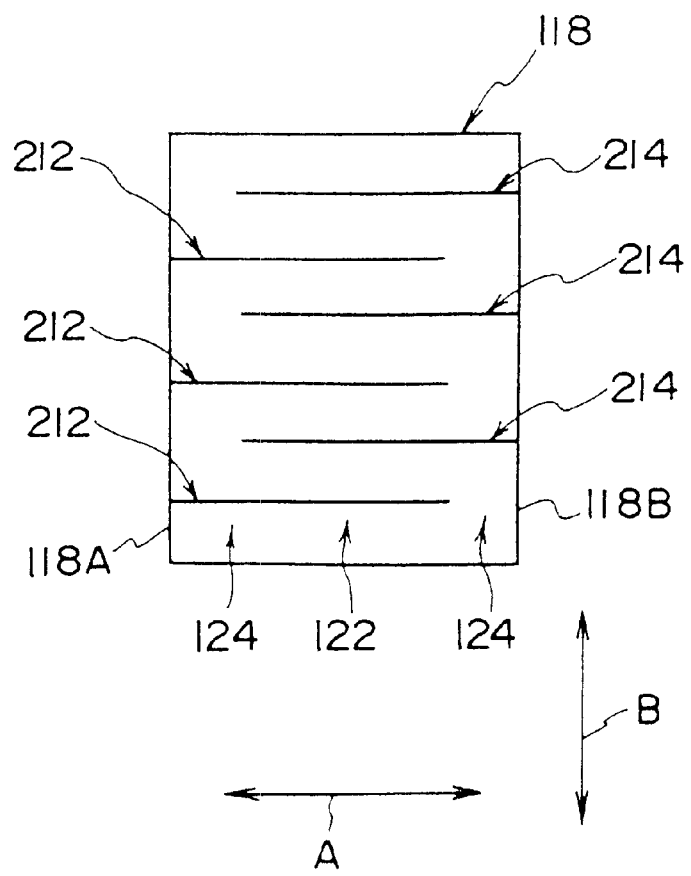
FIG. 61 is a plan view of a block-shaped island portion of a twelfth comparative tire.

Comparative tire 12: a studless pneumatic tire having block-shaped island portions 118 in each of which three first sipes 212 and three second sipes 214 are alternately formed, as shown in FIG. 61.

Comparative tire 13: a studless pneumatic tire having block-shaped island portions 118 each of which has the same sipes as those of Tire 3. However, the tread of this tire has a single layer (cap layer only).

Comparative tire 14: a studless pneumatic tire having block-shaped island portions 118 each of which has the same sipes as those of Comparative tire 11. However, the tread of this tire has a single layer (cap layer only).

Tire 2 and 3 and Comparative tire 11–14 have the same structure except the designs of their treads 112 (block-shaped island portions 118). Also, all the tires have identical dimensions. That is, an entire width W of each island portion 118 in the widthwise direction of the tire is 20 mm, and the length L of each island portion 118 in the circumferential direction of the tire is 25 mm. Each main groove 114 has a depth of 10 mm, and each lug groove 116 has a depth of 10 mm. Each sipe 120 has a depth of 7 mm and a width of 0.3 mm.

In each tire, the rubber of the cap layer 130 has a hardness of 60°, while the rubber of the base layer 126 has a hardness of 65° (JIS (Japanese Industrial Standard), Spring Hardness (Type A)).

TABLE 5

| Tire for trucks & buses | Tire 1 of invention | Comparative tires | | | | |
|---|---|---|---|---|---|---|
| | | 6 | 7 | 8 | 9 | 10 |
| Structure of tread | cap & base | cap & base | cap & base | cap & base | cap | cap |
| On-ice braking performance | 120 | 100 | 105 | 95 | 105 | 95 |
| Block chipping | none | none | occu-rred | occu-rred | occu-rred | occu-rred |
| Wet performance | 100 | 100 | 95 | 90 | 95 | 95 |

Values representing braking performance are indexes which were obtained from the inverses of the measured distances using the value of Comparative tire 6 as a reference.

Values representing wet performance are indexes which were determined using the value of Comparative tire 6 as a reference. The greater the value, the higher the wet performance.

TABLE 6

| Tire for passenger cars | Invention | | Comparative tires | | | |
|---|---|---|---|---|---|---|
| | Tire 2 | Tire 3 | 11 | 12 | 13 | 14 |
| Structure of tread | cap & base | cap & base | cap & base | cap & base | cap | ca |
| On-ice braking performance | 115 | 110 | 100 | 95 | 105 | 95 |
| Wet performance | 105 | 105 | 100 | 95 | 100 | 90 |
| Driving stability | 100 | 100 | 100 | 90 | 90 | 85 |

Values representing braking performance are indexes which were obtained from the inverses of the measured distances using the value of Comparative tire 11 as a reference.

Values representing wet performance are indexes which were determined using the value of Comparative tire 11 as a reference. The greater the value, the higher the wet performance.

Values representing driving stability are indexes which were determined using the value of Comparative tire 11 as a reference. The greater the value, the higher the driving stability.

The results of the above-described test demonstrate that the pneumatic tires for passenger cars according the sixteenth through thirty-eighth embodiments can provide sufficient traction and braking performance on icy surfaces and excellent driving stability, and that the pneumatic tires for trucks and buses according the sixteenth through thirty-eighth embodiments can provide sufficient traction and braking performance on icy surfaces while preventing island portions from chipping.

As described above, the pneumatic tires according the sixteenth through thirty-eighth embodiments having the above-described structure can maintain the stiffness of the block-shaped island portions even when the edge component is increased. This enhances performance on icy surfaces while preventing block chipping and decrease of driving stability, which have been considered to be problems which would occur if the edge component is increased.

Next, a thirty-ninth embodiment of the present invention will be described with reference to FIGS. 62–68.

Figure 62:
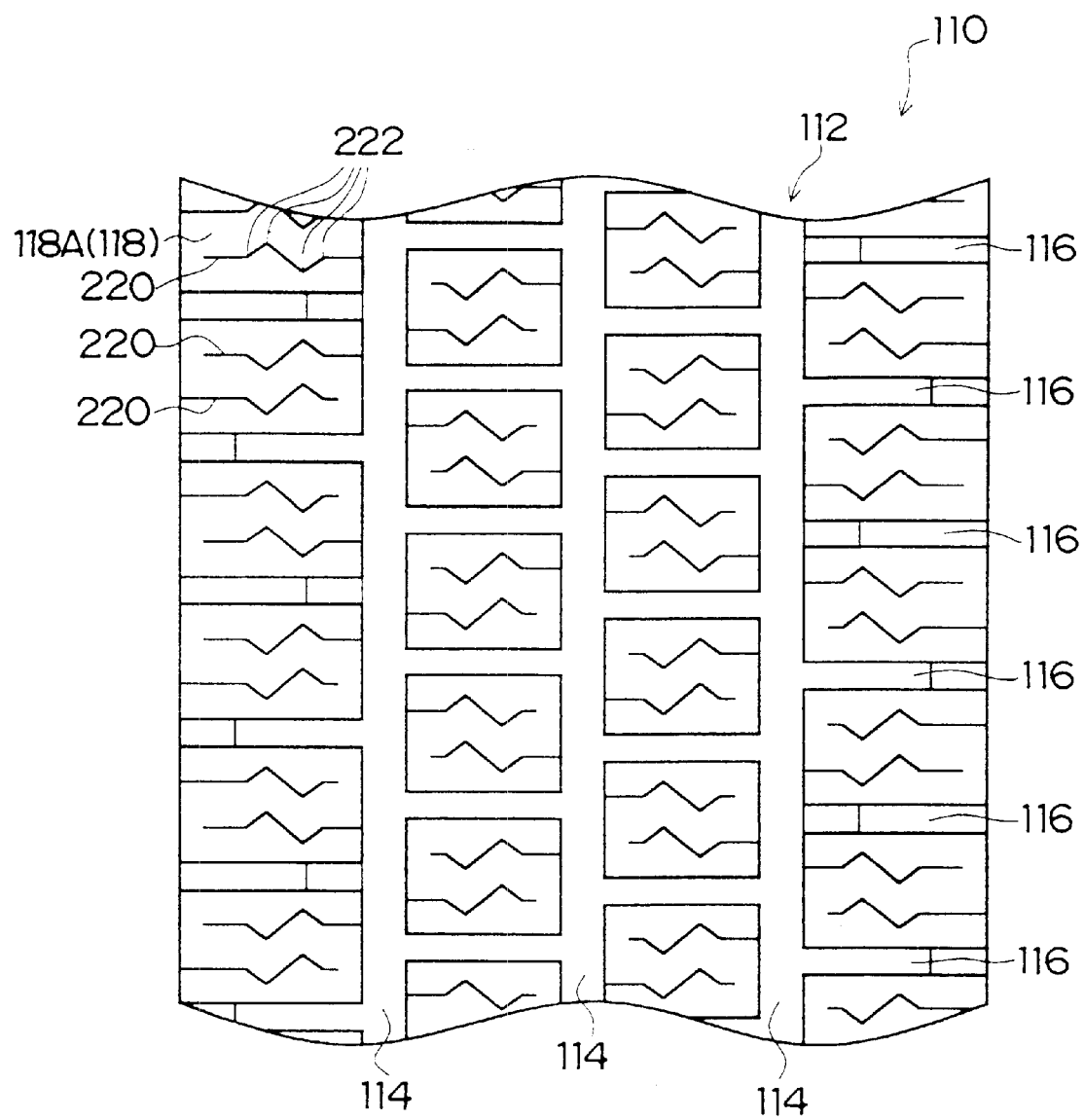
FIG. 62 is a plan view of the tread of a studless pneumatic tire according to a thirty-ninth embodiment of the present invention.

As shown in FIG. 62, a studless pneumatic tire 110 according to the present embodiment has a cylindrical tread 112 extending between a pair of sidewalls (not shown). On the cylindrical tread 112, there are formed a plurality of main grooves 114 extending in the circumferential direction and a plurality of lug grooves 116 extending in the axial direction of the tire, so that a plurality of block-shaped island portions 118 are formed in a divided manner.

Each bock-shaped island portion 118 has lateral sipes 220 extending in the widthwise direction of the tire.

Figure 63:
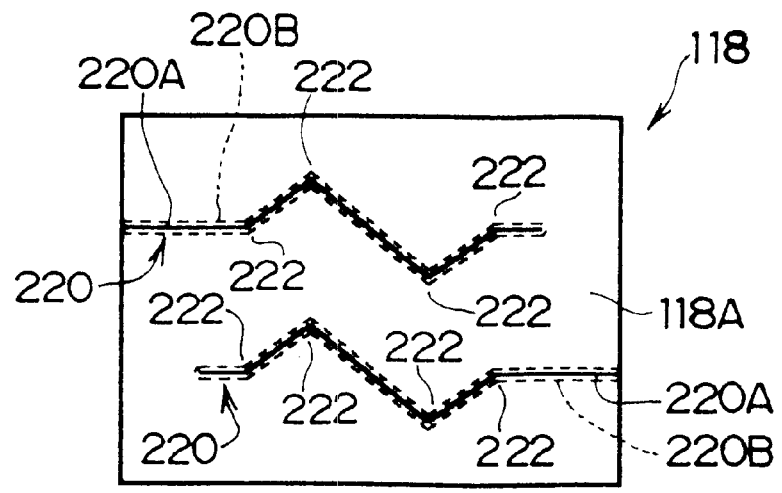
FIG. 63 is an enlarged plan view of a block-shaped island portion shown in FIG. 62.

FIG. 63 shows a plan view of an island portion 118. As shown in this drawing, the island portion 118 has a pair of lateral sipes 220. One end of each lateral sipe 220 is opened to a main groove 114 while the other end thereof terminates within the island portion 118. In other words, each lateral sipe 220 in the present embodiment is of a one-end open type. Each sipe 220 has bent portions at four positions along the widthwise direction of the island portion 118 (longitudinal direction of each lateral sipe 220). Therefore, each lateral sipe 220 has a zigzag shape as viewed in the direction perpendicular to the surface of the island portion 118.

Figure 64:
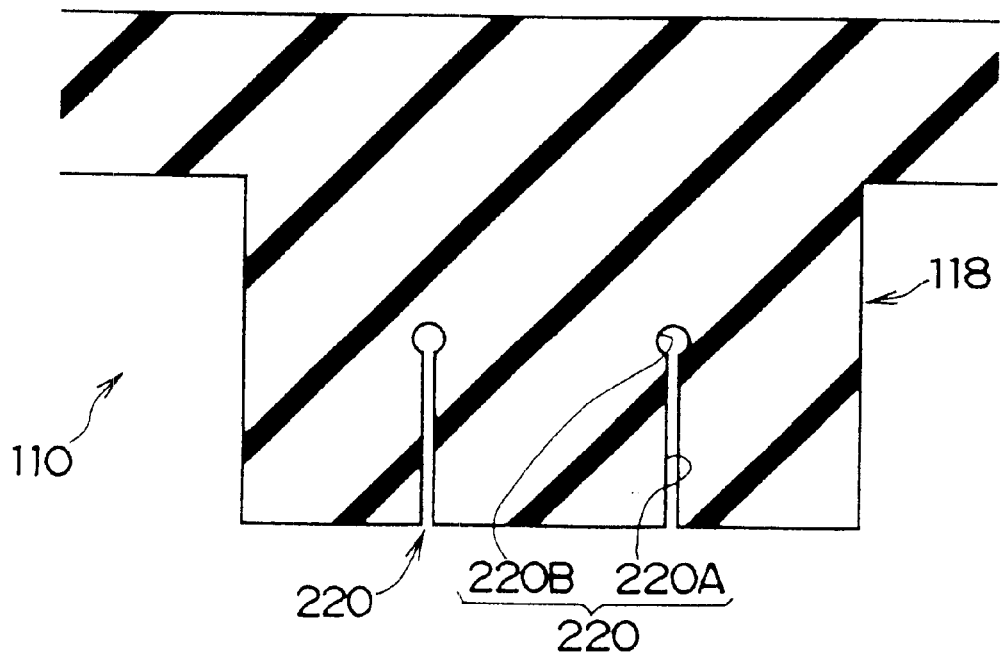
FIG. 64 is a cross-sectional view of the lateral sipes shown in FIG. 63 taken in the circumferential direction of the tire.

FIG. 64 shows a cross-sectional shape of the lateral sipes 220. As shown in this drawing, each lateral sipe 220 consists of a base portion 220A which has an elongated rectangular cross section, and a bottom portion 220B which is formed continuously with the base portion 220A and has a flask-shaped cross section.

Next, a description will be given of the structure of a mold 224 for vulcanizing molding which is used for manufacturing the studless pneumatic tire 110 having the above-described lateral sipes 220.

Figure 65:
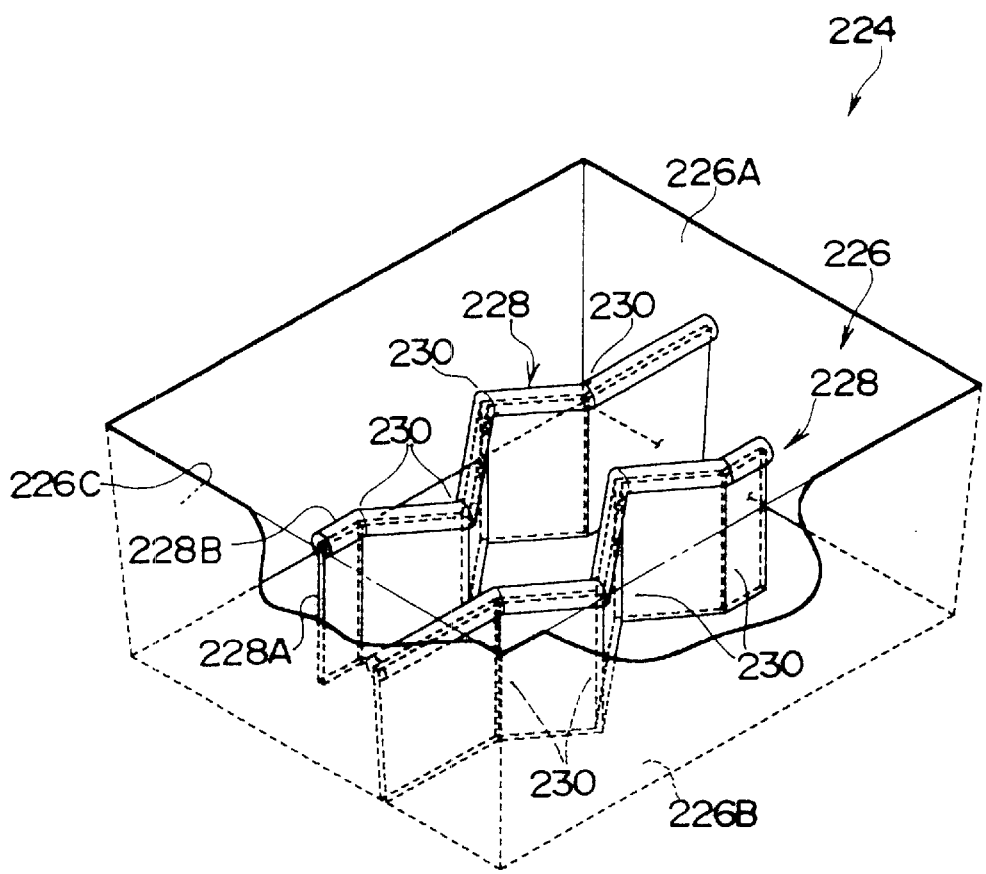
FIG. 65 is a perspective view of a block-forming depression of a mold used for vulcanizing molding.

FIG. 65 shows a perspective view of a depression 226 which is provided in the mold 224 for vulcanizing molding and which is used to form each island portion 118. As shown in this drawing, the depression 226 for forming the island portion 118 has a substantially rectangular parallelepiped shape, and a pair of thin plate-like blades 228 for forming the lateral sipes 220 are disposed within the depression 226. One of the blades 228 is fixed to one side wall 226A and to the bottom wall 226B of the depression 226, and the other of the blades 228 is fixed to the other side wall 226C and to the bottom wall 226B of the depression 226. Unillustrated vents for air release are formed in the bottom wall 226B of the depression 226.

Figure 66:
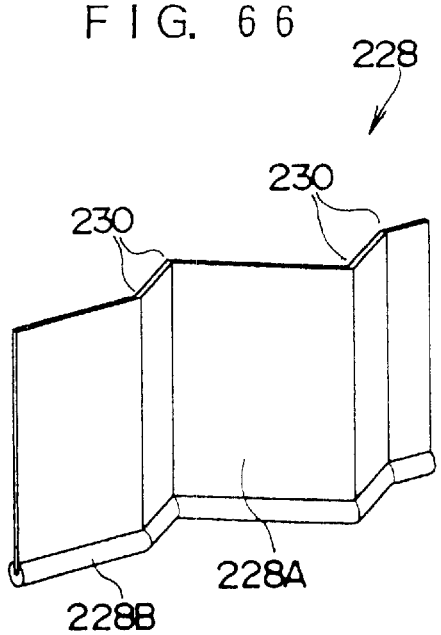
FIG. 66 is a perspective view of a blade shown in FIG. 65.

FIG. 66 shows a single blade 228. As shown in this drawing, the blade 228 is composed of a base portion 228A having a plate-like shape, and a flask-shaped portion 228B. The base portion 228A and the flask-shaped portion 228B have bent portions 230 at four positions along the widthwise direction of the depression 226. Therefore, as viewed from above the depression 226, the blade 280 has a zigzag shape. Accordingly, the blade 228 has a higher stiffness compared to a straight blade. Since the blade 228 has a zigzag shape, the area for supporting the blade 228 within the depression is larger than that in the case of using a straight blade, even though only one longitudinal end of the blade 228 is fixed to the inner surface of the depression 226. Accordingly, the blade 228 can be supported within the depression 226 with an increased stiffness.

The above-described island portion 118 has a length of 23 mm and a width of 30 mm. Each sipe has a width of 0.5 mm and a depth of 10 mm. The bottom portion 220B of each sipe has a diameter of 2 mm. Each main groove 114 has a depth of 20 mm, and each lug groove 116 has a depth of 15 mm. The tire size is11R22.5.

Next, the action and effects of the present embodiment will be described.

First, unvulcanized raw rubber is charged into the mold 224 for vulcanizing molding, and a pressure is applied to the raw rubber by means of an unillustrated bladder disposed within the rubber. As a result, the raw rubber flows into each depression 226. Air within the depression 226 is released to the atmosphere through the unillustrated vents, so that the raw rubber fills the corners of the depression 226, thereby contacting closely the inner surface of the mold. Subsequently, the raw rubber (i.e., raw tire) within the mold 224 is vulcanized at a predetermined temperature for a predetermined period of time. As a result, a studless pneumatic tire 110 is manufactured which is provided with lateral sipes 220 each having a zigzag shape and each having a flask-shaped bottom.

In the present embodiment, since a plurality of bent portions 230 are provided in the blade 228 so as to form it into a zigzag shape, the stiffness of the blade 228 itself increases, and the stiffness in supporting the blade 228 within the depression 226 also increases. Therefore, even when the blade 228 is pressed by raw rubber during vulcanizing molding, the blade 228 is prevented from being deformed.

Further, since each lateral sipe 220 of each molded island portion 118 has a bottom portion 220B having a flask-shaped cross section due to the flask-shaped portion 228B of the blade 228, the on-ice performance of the studless pneumatic tire 110 can be maintained at a satisfactory level. In detail, when the lateral sipe 220 has a plurality of bent portions 222, water draining performance decreases due to contact of the edge portions. Therefore, on icy road surfaces, there is a possibility that the frictional coefficient $\mu$ of the tire decreases with a consequent decrease in the on-ice performance. In the present embodiment, this problem is solved by the bottom portion 228B having a flask-shaped cross section, which enhances the water draining performance. Thus, the frictional coefficient $\mu$ on icy road surfaces can be increased to maintain good on-ice performance.

As described above, according to the present embodiment, it is possible to prevent the blade 228 from bending during the process of vulcanizing molding, and to maintain the good on-ice performance of the studless pneumatic tire 110 manufactured using the mold 224 having the blade 228.

In the present embodiment, since the bottom portion 220B of the lateral sipe 220 has a flask-shaped cross section, stress acting on the bottom portion 220B can be dispersed. Therefore, it is possible to prevent generation of cracks in the bottom portion 220B.

Further, since each lateral sipe 220 is of a one-end open type, in which one end of the lateral sipe 220 is opened to a main groove 114 adjacent to the island portion 118 and the other end terminates within the island portion 118, the stiffness of the island portion 118 can be increased more than in the case where the lateral sipe 220 is of a both-end open type, i.e., an open sipe. This enhances both wear resistance against partial wear and dry driving stability.

In order to prove the above-described effects, tests were carried out to evaluate the on-ice braking performance of the studless pneumatic tire 110 of the present embodiment and to check whether the blades of the mold bent during the process of vulcanizing molding. Results of the tests are shown in the following Table 7.

Figure 67:
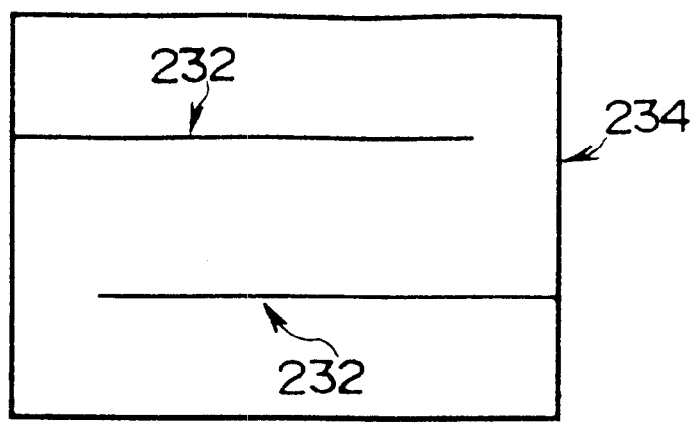
FIG. 67 is a plan view of a block-shaped island of a fifteenth comparative tire, which corresponds to the plan view of FIG. 63 and is used for explaining effects of the thirty-ninth embodiment of the present invention.
Figure 68:
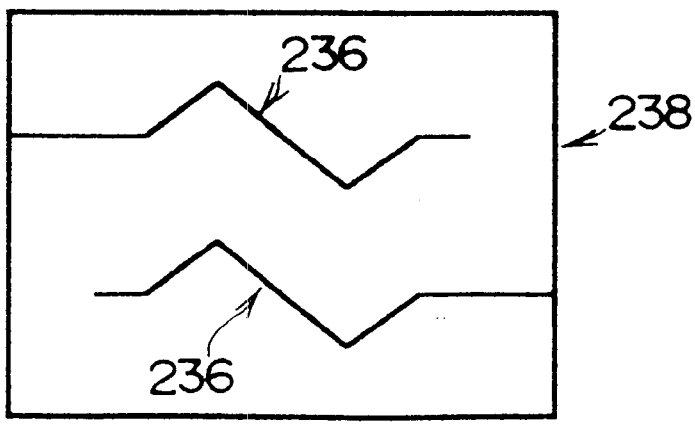
FIG. 68 is a plan view of a block-shaped island of a sixteenth comparative tire, which corresponds to the plan view of FIG. 63 and is used for explaining effects of the thirty-ninth embodiment of the present invention.

The tests were performed using the following tires and molds for vulcanizing molding:

(1) a studless pneumatic tire 110 according to the present embodiment and the mold 224 for manufacturing the tire 110;

(2) Comparative tire 15 (a studless pneumatic tire provided with block-shaped island portions 234 each having straight lateral sipes 232 whose bottoms do not have a flask-shaped cross section, as shown in FIG. 67) and a mold (not shown) for manufacturing Comparative tire 15; and (3) Comparative tire 16 (a studless pneumatic tire provided with block-shaped island portions 238 each having zigzagged lateral sipes 236 whose bottoms do not have a flask-shaped cross section, as shown in FIG. 68) and a mold (not shown) for manufacturing Comparative tire 16.

The on-ice braking test was performed as follows. Tires to be tested were attached to a vehicle, and abrupt braking was performed (to a locked state) while a vehicle was traveling on an icy test course at a speed of 20 Km/H. The distance from a point where braking was started to a point where the vehicle completely stopped was measured. The inverse of the measured distance is shown in Table 7 as an index representing on-ice braking performance.

TABLE 7

| Tires | Tire of the embodiment | Comparative tire 15 | Comparative tire 16 |
|---|---|---|---|
| On-ice braking performance | 101 | 100 | 90 |
| Existence/ absence of bent blades | none | occurred | none |

As is apparent from Table 7, when using Comparative tire 15 provided with straight lateral sipes 232 which did not have bent portions and whose cross sections at the bottom were not flask-shaped, bending of the blades occurred although the on-ice braking performance was good. When using Comparative tire 16 provided with lateral sipes 236 which had bent portions but whose cross sections at the bottom were not flask-shaped, the on-ice braking performance degraded although bending of blades did not occur. In contrast, when using the tire according to the present embodiment provided with zigzagged lateral sipes which had bent portions and which have a flask-shaped cross section at the bottom thereof, the on-ice braking performance was good and bending of blades did not occur.

Figure 69A:
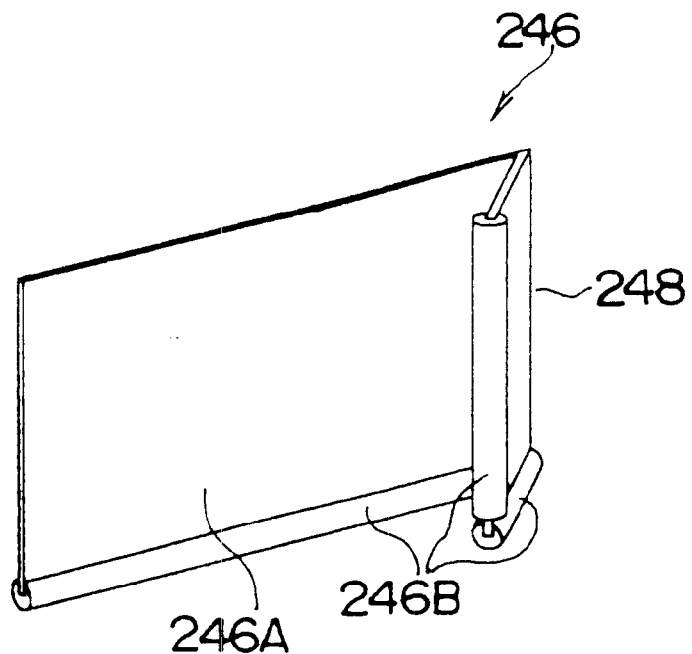
Figure 69B:
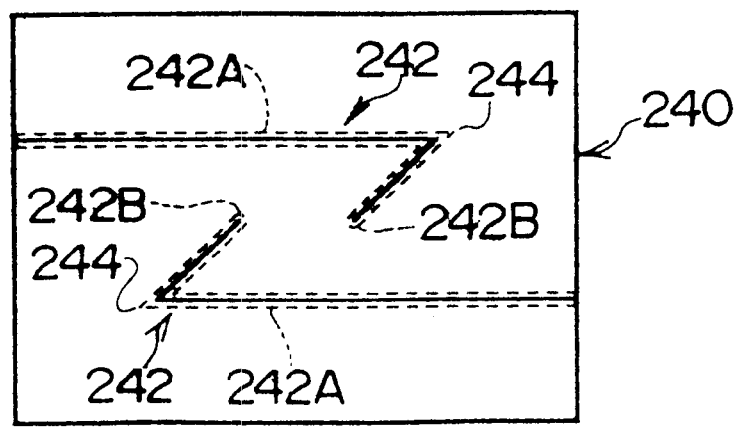

Next, a fortieth embodiment of the present invention will be described with reference to FIGS. 69A and 69B. As shown in FIGS. 69A and 69B, a block-shaped island portion 240 according to the present embodiment has a pair of hook-shaped modified sipes 242 which are arranged alternately. Each sipe 242 has only one bent portion 244. Each of the bottom portion 242A and the inner end 242B of each sipe 242 has a flask-shaped cross section.

FIG. 69A shows a perspective view of a blade 246 used for forming the above-described hook-shaped sipes 242. As shown in this drawing, the blade 246 is formed into a hook-like shape having one bent portion 248. A columnar flask-shaped portion 246B is provided at the lower edge of the base portion 246A of the blade 246 and is also provided at the free edge of the bent portion 248 of the blade 246.

According to the present embodiment, as in the above-described thirty-ninth embodiment, it is possible to prevent the blade 246 from bending during the process of vulcanizing molding, and to maintain the good on-ice performance of the studless pneumatic tire manufactured using the mold having the blade 246.

Further, since each hook-shaped lateral sipe 242 is of a one-end open type, the stiffness of the island portion 240 can be increased more than in the case where the lateral sipe 242 is of a both-end open type. This enhances both wear resistance against partial wear and dry driving stability.

Moreover, in the present embodiment, the columnar flask-shaped portion 246B is provided not only at the lower edge of the base portion 246A of the blade 246 but also at the free edge of the bent portion 248 of the blade 246. Accordingly, the inner end 242B of each hook-shaped sipe 242 has a flask-shaped cross section. This prevents generation of cracks at the inner end 242B. Therefore, generation of cracks can be prevented more effectively through the synergy between the effect of preventing cracks at the inner end 242B of the sipe 242 and the effect of preventing generation of cracks at the bottom portion 242A of the sipe 242. This effect becomes remarkable under severe conditions (e.g., the condition in which the amount of deformation of each island portion is large due to use of soft rubber for the cap layer, and the condition in which both the width and depth of each sipe are large). Since the inner end 242B of the hook-shaped sipe 242 has a flask-shaped cross section, the water draining performance of the sipe 242 at the inner end thereof can be improved.

Next, a forty-first embodiment of the present invention will be described with reference to FIGS. 70A and 70B. As shown in FIG. 70B, a block-shaped island portion 250 according to the present embodiment has a pair of hook-shaped modified sipes 252 which are arranged alternately. Each sipe 252 has three bent portions 254. The bottom portion 252A of each sipe 252 has a flask-shaped cross section.

Figure 70A:
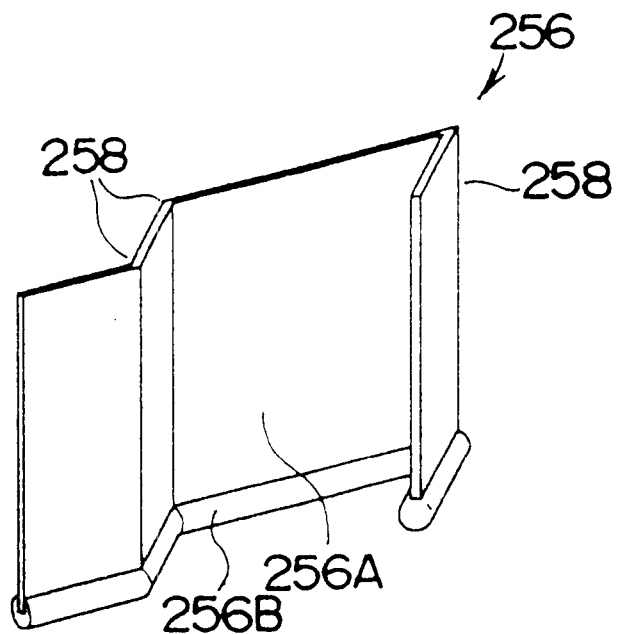
Figure 70B:
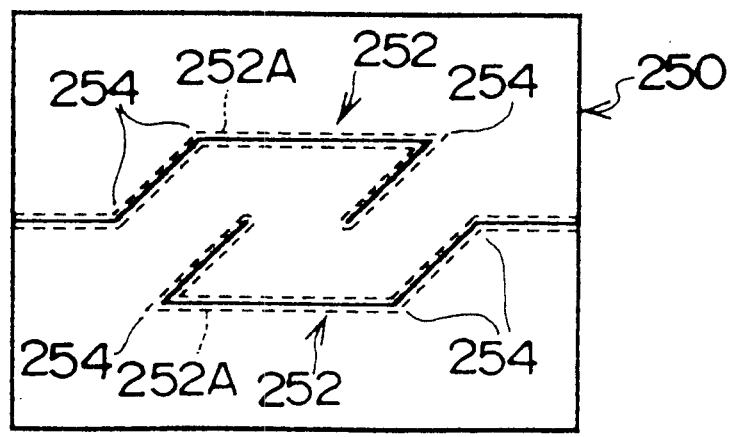

FIG. 70A shows a perspective view of a blade 256 used for forming the above-described hook-shaped sipes 252. As shown in this drawing, the blade 256 is formed into a hook-like shape having three bent portions 258. A columnar flask-shaped portion 256B is provided at the lower edge of the base portion 256A of the blade 256.

According to the present embodiment, as in the above-described thirty-ninth and fortieth embodiments, it is possible to prevent the blade 256 from bending during the process of vulcanizing molding, and to maintain the good on-ice performance of the studless pneumatic tire manufactured using the mold having the blade 256.

Further, since each hook-shaped modified sipe 252 is of a one-end open type, the stiffness of the island portion 250 can be increased more than in the case where the sipe 252 is of a both-end open type. This enhances both wear resistance against partial wear and dry driving stability.

Next, a forty-second embodiment of the present invention will be described with reference to FIGS. 71A and 71B. As shown in FIG. 71B, a block-shaped island portion 260 according to the present embodiment has a pair of tuning fork-shaped modified sipes 262 which are oriented in opposite directions and which are arranged alterately. Each sipe 262 has three bent portions 264. The bottom portion 262A of each sipe 262 has a flask-shaped cross section.

Figure 71A:
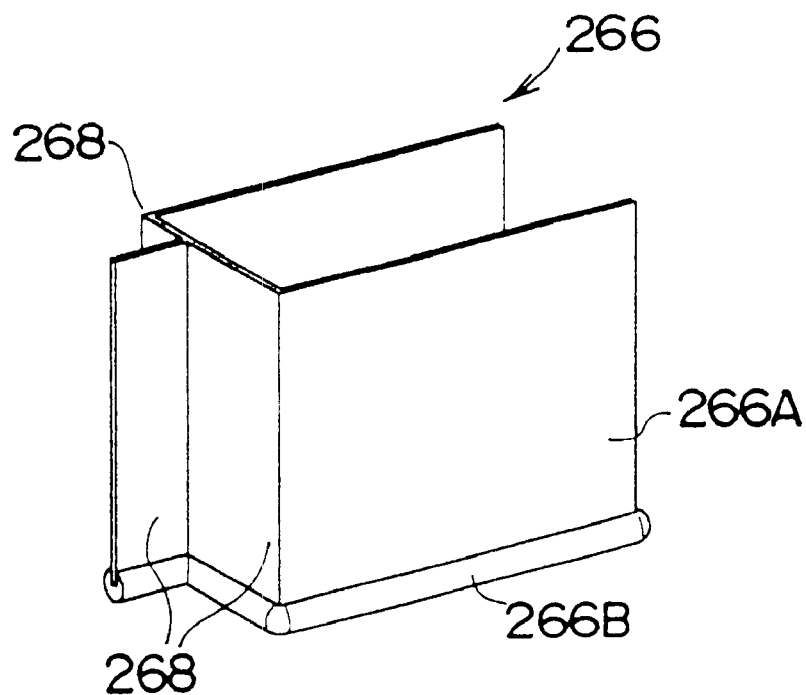
Figure 71B:
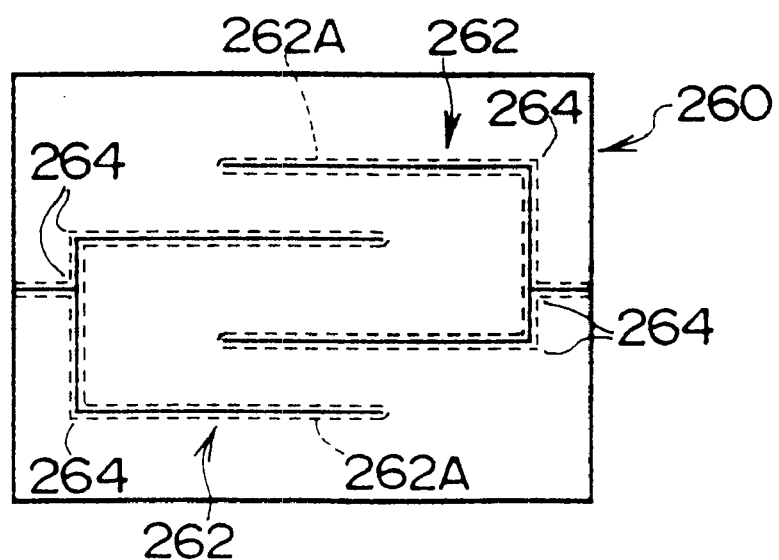

FIG. 71A shows a perspective view of a blade 266 used for forming the above-described hook-shaped sipes 262. As shown in this drawing, the blade 266 is formed into a tuning fork-like shape having three bent portions 268. A columnar flask-shaped portion 266B is provided at the lower edge of the base portion 266A of the blade 266.

According to the present embodiment, as in the above-described thirty-ninth through forty-first embodiments, it is possible to prevent the blade 266 from bending during the process of vulcanizing molding, and to maintain the good on-ice performance of the studless pneumatic tire manufactured using the mold having the blade 266.

Further, since each tuning fork-shaped sipe 262 is of a one-end open type, the stiffness of the island portion 260 can be increased more than the case where the sipe 262 is of a both-end open type. This enhances wear resistance against partial wear and dry driving stability.

In the above-described thirty-ninth through forty-second embodiments, one-end open type sipes were used. However, the present invention is not limited thereto, and both-end open type sipes may be employed. In this case, each blade is supported by the depression through three sides thereof other than the top side.

It is sufficient that each blade has at least one bent portion, i.e., each sipe has at least one bent portion.

Figure 72:
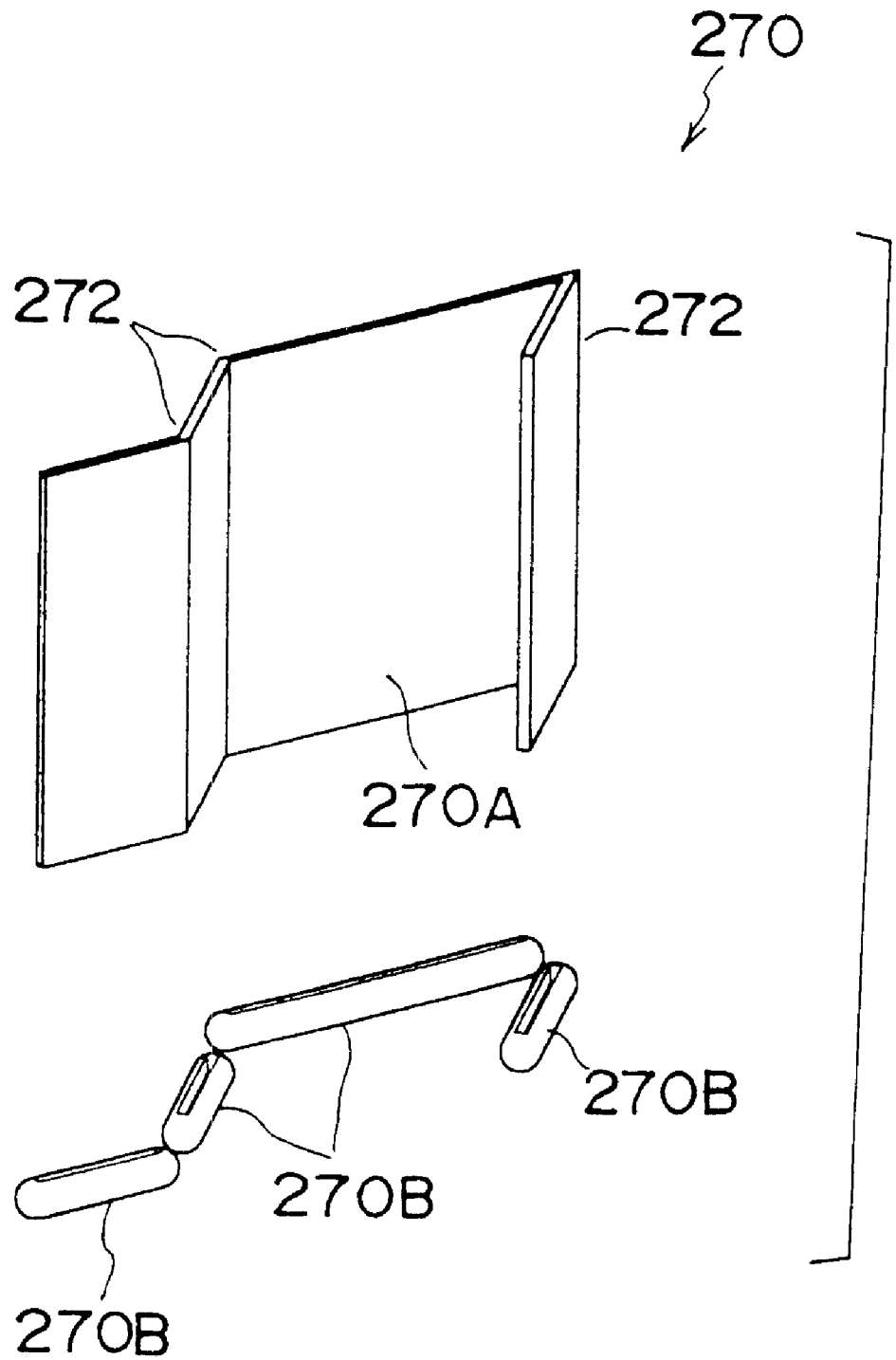
FIG. 72 is a perspective view showing another embodiment of the blade.

In the above-described thirty-ninth through forty-second embodiments, the flask-shaped portion extends along the bent shape of the blade and is integrally formed therewith. However, the present invention is not limited thereto. The flask-shaped portion may be divided at bent portions. For example, a hook-shaped blade 270 shown in FIG. 72 has three bent portions, and a plurality of divided portions of the columnar flask-shaped portions 270B are provided at the lower end of the base portion 270A of the blade 270. The flask-shaped portions 270B are divided at the bent portions 272, and each divided portion of the flask-shaped portion 270B is formed in a straight shape. This structure facilitates the manufacture of the blade compared to the case of using a flask-shaped portion which extends along the bent shape of the blade and is integrally formed therewith. In the above-described thirty-ninth through forty-second embodiments, each longitudinal end of each divided portion of the flask-shaped portion 270B has a semi-sphere shape for point contact between adjacent divided portions. However, each longitudinal end of each divided portion may be cut to have a slant surface corresponding to the bent angle at the corresponding end, thereby improving the continuity. Further, a structure may be employed in which each longitudinal end of each divided portion of the flask-shaped portion has semi-sphere longitudinal ends and the clearance between adjacent ends is filled by welding.

As described above, the mold for vulcanizing molding according to the thirty-ninth through forty-second embodiments can prevent the blades from bending during the process of vulcanizing molding. In addition, pneumatic tires manufactured using the mold can provide excellent on-ice performance.

While the embodiments of the present invention, as herein disclosed, constitute a preferred form, it is to be understood that alter forms might be adopted.

What is claimed is:

1. A studless pneumatic tire in which a plurality of block-shaped island portions each having sipes are provided on a cylindrical tread extending between a pair of annular sidewalls, wherein:

said tread has at least two rubber layers having different hardnesses, and the tread has at least one area having soft rubber and hard rubber and including sipes, the tread has at least one other area having soft rubber and hard rubber and including sipes, the density of the sipes in the at least one area is larger than the density of the sipes in the at least one other area, the density of the sipes being defined as a total projected length of portions of the sipes within an area, the ratio of the volume of hard rubber to the volume of soft rubber in the at least one area is larger than the ratio of the volume of hard rubber to the volume of soft rubber in the at least one other area, and further wherein each island portion comprises:

a first sipe which has an extension segment extending from a first lateral end of said island portion and traversing a first edge region and a central region of said island portion in a substantially axial direction, and a return segment, one end of said return segment being turned back at a second interface between the central region and a second edge region adjacent to a second lateral end or in the vicinity thereof and the other end of said return segment being terminated within the central region; and a second sipe which has an extension segment extending from a second lateral end of said island portion and traversing the second edge region and a central region of said island portion in the substantially axial direction, and a return segment, one end of said return segment being turned back as a first interface between the central region and the first edge region adjacent to the first lateral end or in the vicinity thereof and the other end of said return segment being terminated within the central region.

2. A studless pneumatic tire having a plurality of block-shaped island portions formed on a cylindrical tread extending between a pair of sidewalls, said island portions having laterally extending sipes and being separated by a plurality of main grooves extending in the circumferential direction as well as by many lug grooves, wherein each island portion comprises:

a first sipe which has an extension segment extending from a first lateral end of said island portion facing a first main groove and traversing a first edge region and a central region of said island portion in a substantially axial direction, and a return segment whose tip is turned back at a second interface between the central region and a second edge region or in the vicinity thereof and which is terminated within the central region of said island portion; and a second sipe which has an extension segment extending from a second lateral end of said island portion facing a second main groove and traversing the second edge region and the central region of said island portion in a substantially axial direction, and a return segment whose tip is turned back at a first interface between the central region and the first edge region or in the vicinity thereof and which is terminated within the central region of said island portion;

whereby said first and second sipes divide the central region of said island portion into a larger number of island elements compared to the edge regions thereof.

3. A studless pneumatic tire according to claim 2, wherein the extension segments of said first and second sipes are disposed side by side.

4. A studless pneumatic tire according to claim 2, wherein said first and second sipes are formed such that the tips of the return segments of said first and second sipes face each other.

5. A studless pneumatic tire having a plurality of block-shaped island portions formed on a cylindrical tread extending between a pair of sidewalls, said island portions having laterally extending sipes and being separated by a plurality of main grooves extending in the circumferential direction as well as by many lug grooves, wherein each island portion comprises:

a first sipe which has an extension segment extending from a first lateral end of said island portion facing a first main groove and traversing a first edge region and a central region of said island portion in a substantially axial direction, and a return segment whose tip is turned back at a second interface between the central region and a second edge region or in the vicinity thereof and which is terminated within the central region of said island portion, the return segment being substantially parallel to the extension segment; and a second sipe which has an extension segment extending from a second lateral end of said island portion facing a second main groove and traversing the second edge region and the central region of said island portion in a substantially axial direction, and a return segment whose tip is turned back at a first interface between the central region and the first edge region or in the vicinity thereof and which is terminated within the central region of said island portion, the return segment being substantially parallel to the extension segment;

whereby said first and second sipes divide the central region of said island portion into a larger number of island elements compared to the edge regions thereof.

* * * * *

UNITED STATES PATENT AND TRADEMARK OFFICE
CERTIFICATE OF CORRECTION

PATENT NO.    : 6,408,911 B1
DATED         : June 25, 2002
INVENTOR(S)   : Chishiro Tanabe et al.

It is certified that error appears in the above-identified patent and that said Letters Patent is hereby corrected as shown below:

<u>Title page,</u>
Item [*] Notice, delete "0" and insert -- 938 --.

Signed and Sealed this

Twentieth Day of April, 2004

JON W. DUDAS
*Acting Director of the United States Patent and Trademark Office*